(12) United States Patent
Ogaki et al.

(10) Patent No.: US 7,460,952 B2
(45) Date of Patent: Dec. 2, 2008

(54) NAVIGATION APPARATUS, AND DATA PROCESSING METHOD AND COMPUTER PROGRAM USED THEREWITH

(75) Inventors: Tadao Ogaki, Chiba (JP); Shizue Okuda, Kanagawa (JP)

(73) Assignee: Sony Corporation, Tokyo (JP)

(*) Notice: Subject to any disclaimer, the term of this patent is extended or adjusted under 35 U.S.C. 154(b) by 236 days.

(21) Appl. No.: 11/098,677

(22) Filed: Apr. 4, 2005

(65) Prior Publication Data

US 2005/0234638 A1 Oct. 20, 2005

(30) Foreign Application Priority Data

| Apr. 5, 2004 | (JP) | 2004-110660 |
| Aug. 6, 2004 | (JP) | 2004-230085 |

(51) Int. Cl.
*G01C 21/32* (2006.01)
(52) U.S. Cl. ............... 701/209; 345/420
(58) Field of Classification Search ............ 701/200, 701/202, 208, 209, 211; 345/420, 419; 340/995.1, 340/990, 995.11, 995.12, 995.19
See application file for complete search history.

(56) References Cited

U.S. PATENT DOCUMENTS

| 5,504,482 | A | * | 4/1996 | Schreder | 340/995.13 |
| 5,913,918 | A | * | 6/1999 | Nakano et al. | 701/208 |
| 5,917,436 | A | * | 6/1999 | Endo et al. | 340/995.14 |
| 6,157,342 | A | | 12/2000 | Okude et al. | |
| 6,169,516 | B1 | * | 1/2001 | Watanabe et al. | 342/357.13 |
| 6,324,469 | B1 | * | 11/2001 | Okude et al. | 701/208 |
| 6,424,911 | B2 | * | 7/2002 | Yamashita et al. | 701/208 |
| 6,999,075 | B2 | * | 2/2006 | Kumagai | 345/420 |
| 2001/0005810 | A1 | | 6/2001 | Senda et al. | |
| 2001/0028350 | A1 | | 10/2001 | Matsuoka et al. | |
| 2003/0236618 | A1 | * | 12/2003 | Kamikawa et al. | 701/211 |

(Continued)

FOREIGN PATENT DOCUMENTS

EP 1 107 189 A2 6/2001

(Continued)

OTHER PUBLICATIONS

European Patent Office Communication and Search Report issued in EP 05 00 7323 (3 pages).

(Continued)

*Primary Examiner*—Dalena Tran
(74) *Attorney, Agent, or Firm*—Finnegan, Henderson, Farabow, Garrett & Dunner, L.L.P.

(57) ABSTRACT

A navigation apparatus displays navigation information generated based on map information. The apparatus includes a positional information acquiring section for acquiring positional information, a storage section storing two-dimensional map data, three-dimensional graphic data, and node-based altitude data of recorded altitude data of nodes which are set on a link used as a route, a data processor generating and outputting three-dimensional display information for a guidance region by receiving the positional information acquired by the positional information acquiring section, and acquiring data from the storage section based on the received positional information, and a display device displaying the information output from the data processor. The data processor calculates the altitudes of points on the route based on the node-based altitude data, and generates and outputs, to the display device, three-dimensional route information in which data of the calculated altitudes is set as a parameter.

12 Claims, 14 Drawing Sheets

U.S. PATENT DOCUMENTS

2005/0102095 A1 * 5/2005 Vanegas et al. ............ 701/200

FOREIGN PATENT DOCUMENTS

| | | |
|---|---|---|
| JP | 09-159479 | 6/1997 |
| JP | 09-222851 | 8/1997 |
| JP | 10-143066 | 5/1998 |
| JP | 10-171347 | 6/1998 |
| JP | 10-274537 | 10/1998 |
| JP | 10-332393 | 12/1998 |
| JP | 2002-024862 | 1/2002 |
| JP | 2002-236444 | 8/2002 |
| JP | 2004-046746 | 2/2004 |

OTHER PUBLICATIONS

Office Action issued in JP 2004-230085 (2 pages).

* cited by examiner

FIG. 5

| ITEM NAME | TYPE | NUMBER OF BYTES |
|---|---|---|
| VERSION INFORMATION | UNSIGNED | 4 |
| NUMBER OF LINKS | UNSIGNED | 2 |
| LINK ID-1 | UNSIGNED | 4 |
| OFFSET-1 UP TO SHAPE NODE INFORMATION | UNSIGNED | 2 |
| LINK ID-2 | UNSIGNED | 4 |
| OFFSET-2 UP TO SHAPE NODE INFORMATION | UNSIGNED | 2 |
| LINK ID-3 | UNSIGNED | 4 |
| OFFSET-3 UP TO SHAPE NODE INFORMATION | UNSIGNED | 2 |
| ⋮ | ⋮ | ⋮ |
| LINK ID-XX | UNSIGNED | 4 |
| OFFSET-XX UP TO SHAPE NODE INFORMATION | UNSIGNED | 2 |
| NUMBER OF LINKS (LINK ID-1) | UNSIGNED | 2 |
| REFERENCE LONGITUDE (1/1024 SECONDS) | SIGNED | 4 |
| REFERENCE LATITUDE (1/1024 SECONDS) | SIGNED | 4 |
| ALTITUDE (IN UNITS OF 10 cm) | UNSIGNED | 4 |
| NEXT-NODE-DIFFERENCE LONGITUDE (1/1024 SECONDS) | SIGNED | 2 |
| NEXT-NODE-DIFFERENCE LATITUDE (1/1024 SECONDS) | SIGNED | 2 |
| NEXT-NODE ALTITUDE/ INTERPOLATION INFORMATION (IN UNITS OF 10 cm) | UNSIGNED | 2 |
| NEXT-NODE-DIFFERENCE LONGITUDE (1/1024 SECONDS) | SIGNED | 2 |
| NEXT-NODE-DIFFERENCE LATITUDE (1/1024 SECONDS) | SIGNED | 2 |
| NEXT-NODE ALTITUDE/ INTERPOLATION INFORMATION (IN UNITS OF 10 cm) | UNSIGNED | 2 |
| ⋮ | ⋮ | ⋮ |
| NEXT-NODE-DIFFERENCE LONGITUDE (1/1024 SECONDS) | SIGNED | 2 |
| NEXT-NODE-DIFFERENCE LATITUDE (1/1024 SECONDS) | SIGNED | 2 |
| NEXT-NODE ALTITUDE/ INTERPOLATION INFORMATION (IN UNITS OF 10 cm) | UNSIGNED | 2 |
| NUMBER OF LINKS (LINK ID-2) | UNSIGNED | 2 |
| REFERENCE LONGITUDE (1/1024 SECONDS) | SIGNED | 4 |
| REFERENCE LATITUDE (1/1024 SECONDS) | SIGNED | 4 |
| ALTITUDE (IN UNITS OF 10 cm) | UNSIGNED | 2 |
| NEXT-NODE-DIFFERENCE LONGITUDE (1/1024 SECONDS) | SIGNED | 2 |
| NEXT-NODE-DIFFERENCE LATITUDE (1/1024 SECONDS) | SIGNED | 2 |
| NEXT-NODE ALTITUDE/ INTERPOLATION INFORMATION (IN UNITS OF 10 cm) | UNSIGNED | 2 |
| NEXT-NODE-DIFFERENCE LONGITUDE (1/1024 SECONDS) | SIGNED | 2 |
| NEXT-NODE-DIFFERENCE LATITUDE (1/1024 SECONDS) | SIGNED | 2 |
| NEXT-NODE ALTITUDE/ INTERPOLATION INFORMATION (IN UNITS OF 10 cm) | UNSIGNED | 2 |
| ⋮ | ⋮ | ⋮ |
| NEXT-NODE-DIFFERENCE LONGITUDE (1/1024 SECONDS) | SIGNED | 2 |
| NEXT-NODE-DIFFERENCE LATITUDE (1/1024 SECONDS) | SIGNED | 2 |
| NEXT-NODE ALTITUDE/ INTERPOLATION INFORMATION (IN UNITS OF 10 cm) | UNSIGNED | 2 |
| NUMBER OF LINKS (LINK ID-3) | UNSIGNED | 2 |
| ⋮ | ⋮ | ⋮ |
| NUMBER OF LINKS (LINK ID-XX) | UNSIGNED | 2 |
| ⋮ | ⋮ | ⋮ |

(1) CAMERA POSITION SET (2) GUIDANCE POINT (CROSSING) DRAWN (3) ROUTE DRAWN

NAVIGATION APPARATUS, AND DATA PROCESSING METHOD AND COMPUTER PROGRAM USED THEREWITH

CROSS REFERENCES TO RELATED APPLICATIONS

The present invention contains subject matter related to Japanese Patent Application JP 2004-20230085 filed in the Japanese Patent Office on Aug. 6, 2004, and Japanese Patent Application JP 2004-110660 filed in the Japanese Patent Office on Apr. 5, 2004, the entire contents of which are incorporated herein by reference.

BACKGROUND OF THE INVENTION

1. Field of the Invention

The present invention relates to a navigation apparatus that displays, for a user, guidance information such as routes and a destination, and a data processing method and computer program used therewith.

More specifically, the present invention relates to a navigation apparatus in which, in a navigation system using three-dimensional graphic data, by executing data processing based on a change in terrain altitude, various types of processing, such as displaying of data such as route information and positional information of a vehicle having the navigation apparatus and setting of a camera position, can be executed as processing matching three-dimensional information. The present invention also relates to a data processing method and computer program used therewith.

2. Description of the Related Art

In a navigation system, relatively broad map information is stored beforehand. Based on present position information obtained through the global positioning system (GPS) or from another position detecting device, a corresponding piece of the map information is read and displayed as guidance information to a user.

Many navigation systems have been developed for vehicles and are in use in car-mounted form. In this case, guidance information that is displayed on the screen depending on the momentarily changing present position is sequentially updated. In addition, in response to a destination (or other driving information) which is input from the user (driver), the navigation systems display map information in accordance with a route to the destination.

Moreover, recently, a system is widely used in which, by mixing three-dimensional computer graphics technology with a navigation system, the three-dimensional images of structures such as buildings and roads are rendered and allocated at corresponding positions on the map, and guidance information is displayed as a three-dimensional map.

In another proposed system, information of a route to a destination is displayed in animated form on three-dimensional image data, and a vehicle symbol indicating positional information of a vehicle using the system is displayed as a marker.

In another proposed system, the display form of a three-dimensional image data displayed on the display is set at a viewpoint position of a driver, or a mode can be set in which the image data can be displayed as data of an image viewed from a high position called a "bird's eye view" and in which the position of a camera capturing three-dimensional image data, that is, a camera viewpoint, can be changed. Examples of the related art disclosing technology for changing the camera viewpoint position include, for example, Japanese Unexamined Patent Application Publication No. 2002-24862.

In navigation systems of the related art using the three-dimensional graphics technology, two-dimensional data is used as basic map data itself, and, in most cases, three-dimensional data is used as a graphical representation such as a building or the like displayed on two-dimensional map data.

Positional information of the vehicle using this system is acquired by using externally input positional information such as GPS information. The vehicle symbol on the three-dimensional image data is displayed, in animated form, on the display based on the acquired information, and information of a route starting from the vehicle symbol to a destination is also displayed. In navigation systems of the related art, route information and display data of the vehicle symbol are generated based on two-dimensional data, and this data is drawn together with three-dimensional graphic display data of buildings, etc.

When three-dimensional data is used to display a building, etc., and route information and vehicle symbol generated based on two-dimensional data are displayed on the three-dimensional data, a phenomenon occurs in which the route information or the positional information of the vehicle sinks into the ground or in which the route information or the positional information of the vehicle is disposed in the air at a distance from the ground. Accordingly, the phenomenon causes a situation in which the above information, which is displayed on the display, completely differs from its actual state. This also applies to setting of a camera position. If a camera is set without considering altitude information, a phenomenon occurs in which the camera position sinks into the road or in which the camera position is set at an extremely high position. This phenomenon causes a situation in which the information displayed for the user is inappropriate.

SUMMARY OF THE INVENTION

The present invention has been made in view of the above circumstances. It is desirable to provide a navigation apparatus in which, in a navigation system using three-dimensional graphic data, by performing data processing based on a change in terrain altitude, display of data such as route information and positional information of a vehicle having the apparatus, and setting of a camera position, etc., are accurately executed, and to a data processing method and computer program used therewith.

According to an embodiment of the present invention, there is provided a navigation apparatus for displaying navigation information generated based on map information, the navigation apparatus including a positional information acquiring means for acquiring positional information, a storage means for storing two-dimensional map data, three-dimensional graphic data, and node-based altitude data of recorded altitude data of nodes which are set on a link used as a route, a data processor generating and outputting three-dimensional display information for a guidance region by receiving the positional information acquired by the positional information acquiring means, and acquiring data from the storage means based on the received positional information, and a display means for displaying the information output from the data processor, wherein the data processor calculates the altitudes of points on the route based on the node-based altitude data, and generates and outputs, to the display means, three-dimensional route information in which data of the calculated altitudes is set as a parameter.

In the navigation apparatus, the data processor may calculate one of an altitude of the navigation apparatus and an altitude of a vehicle having the navigation apparatus based on the positional information acquired by the positional information acquiring means and the node-based altitude data, and may generate and output, to the display means, symbol data which represents one of the navigation apparatus and the vehicle and in which information of the calculated altitude is set as a parameter for the three-dimensional display information.

In the navigation apparatus, the data processor may calculate one of an altitude of the navigation apparatus and an altitude of a vehicle having the navigation apparatus based on the positional information acquired by the positional information acquiring means and the node-based altitude data, and may generate and output, to the display means, three-dimensional data obtained in observation from a camera viewpoint set within an allowable range for setting the camera viewpoint, the allowable range having altitudes not less than the calculated altitude.

In the navigation apparatus, the node-based altitude data stored in the storage means may be recorded altitude data in units of nodes included in each of links used as routes having identifiers set therefor, and sequence information of a link identifier of a particular link to a destination may be input to the data processor, and, based on altitude data of nodes included in a link selected based on the link identifier, three-dimensional route information reflecting altitude information may be generated and output to the display means by the data processor.

In the navigation apparatus, the positional information acquired by the positional information acquiring means may be input to the data processor, and the data processor may execute processing in which, when three-dimensional data of a guidance point existing in a traveling direction is stored in the storage means, three-dimensional data of the guidance point is generated and output to the display means, and, when the three-dimensional data of the guidance point is not stored in the storage means, the two-dimensional map is acquired from the storage means and is output to the display means.

In the navigation apparatus, the storage means may store, as interpolation-point-based altitude data, altitude information of interpolation points which are each set between nodes, and the data processor may calculate the altitudes of points on the route based on the interpolation-point-based altitude data, and may generate and output, to the display means, one of symbol information of a vehicle having the navigation apparatus and three-dimensional route information in which data of the calculated altitudes is set as a parameter.

In the navigation apparatus, in the altitude information of the interpolation points which are each set between nodes, the altitude of only one interpolation point of a set of two adjacent interpolation points having an altitude difference not greater than a predetermined threshold difference value may be stored as the interpolation-point-based altitude data.

According to another embodiment of the present invention, there is provided a data processing method for displaying navigation information generated based on map information, the data processing method including the steps of acquiring positional information, generating and outputting three-dimensional display information for a guidance region by receiving the positional information acquired in the step of acquiring the positional information, and acquiring, from storage means, data for use in generating the three-dimensional display information based on the received positional information, and displaying the three-dimensional display information generated in the step of generating and outputting the three-dimensional display information, wherein the step of generating and outputting the three-dimensional display information includes a step of calculating the altitudes of points on a route on the basis of node-based altitude data of recorded altitude data of nodes which are set on a link used as a route, and generating and outputting, to display means, three-dimensional route information in which data of the calculated altitudes is set as a parameter.

In the data processing method, the step of generating and outputting the three-dimensional display information may include a step of calculating one of an altitude of the navigation apparatus and an altitude of a vehicle having the navigation apparatus based on the positional information acquired in the step of acquiring the positional information and the node-based altitude data, and generating and outputting, to the display means, symbol data which represents one of the navigation apparatus and the vehicle and in which information of the calculated altitude is set as a parameter for the three-dimensional display information.

In the data processing method, the step of generating and outputting the three-dimensional display information may include a step of calculating one of an altitude of the navigation apparatus and an altitude of a vehicle having the navigation apparatus based on the positional information acquired in the step of acquiring the positional information and the node-based altitude data, and generating and outputting, to the display means, three-dimensional data obtained in observation from a camera viewpoint set within an allowable range for setting the camera viewpoint, the allowable range having altitudes not less than the calculated altitude.

In the data processing method, the node-based altitude data may be recorded altitude data in units of nodes included in each of links used as routes having identifiers set therefor, and the step of generating and outputting the three-dimensional display information may include a step of receiving sequence information of a link identifier of a particular link to a destination, and generating and outputting, to the display means, three-dimensional route information based on altitude data of nodes included in a link selected based on the link identifier, the three-dimensional route information reflecting altitude information.

In the data processing method, in the step of generating and outputting the three-dimensional display information, after the positional information acquired in the step of acquiring the positional information is input, when three-dimensional data of a guidance point existing in a traveling direction is stored in the storage means, three-dimensional data of the guidance point may be generated and output to the display means, and, when the three-dimensional data of the guidance point is not stored in the storage means, two-dimensional map data may be acquired from the storage means and may be output to the display means.

In the data processing method, the step of generating and outputting the three-dimensional display information may include a step of acquiring, from the storage means, interpolation-point-based altitude data used as altitude information of interpolation points which are each set between nodes, calculating the altitudes of points on the route based on the interpolation-point-based altitude data, and generating and outputting, to the display means, one of symbol information of a navigation apparatus or a vehicle having the navigation apparatus, and three-dimensional route information in which data of the calculated altitudes is set as a parameter.

According to an embodiment of the present invention, there is provided a computer program for executing processing for displaying navigation information generated based on map information, the computer program including the steps of acquiring positional information, generating and outputting three-dimensional display information for a guidance region by receiving the positional information acquired in the step of acquiring the positional information, and acquiring, from storage means, data for use in generating the three-dimensional display information based on the received positional information, and displaying the three-dimensional display information generated in the step of generating and outputting the three-dimensional display information, wherein the step of generating and outputting the three-dimensional display information includes a step of calculating the altitudes of points on a route on the basis of node-based altitude data of recorded altitude data of nodes which are set on a link used as a route, and generating and outputting, to display means, three-dimensional route information in which data of the calculated altitudes is set as a parameter.

In the computer program, the step of generating and outputting the three-dimensional display information may include a step of acquiring, from the storage means, interpolation-point-based altitude data used as altitude information of interpolation points which are each set between nodes, calculating the altitudes of points on the route based on the interpolation-point-based altitude data, and generating and outputting, to the display means, one of symbol information of a navigation apparatus or a vehicle having the navigation apparatus, and three-dimensional route information in which data of the calculated altitudes is set as a parameter.

A computer program according to an embodiment of the present invention has a form that can be provided by a storage medium or communication medium provided in computer-readable form to a computer system capable of executing various types of program code, for example, a recording medium such as a compact disk, a floppy disk, or a magneto-optical disk, or by a communication medium such as a network. By providing this program in computer-readable form, processing in accordance with the provided program is implemented.

Other features and advantages of the present invention become apparent through a more detailed description based on the following embodiments of the present invention and the accompanying drawings. In this specification, a system is a logical set of a plurality of apparatuses and is not limited to a form having the apparatuses in a single housing.

According to an embodiment of the present invention, when a navigation apparatus displays route information representing, for example, a route to a destination, the navigation apparatus calculates the altitudes of points on the route based on node-based altitude data on a link forming the route, and generates and displays three-dimensional route information in which altitude data of the calculated altitudes is set as a parameter. Thus, this enables route display matching three-dimensionally drawn data, so that route display become executable which matches three-dimensionally drawn data used as background data and in which differences in level can be recognized without performing such unnatural drawing that route information is drawn in the air or penetrates the ground.

According to an embodiment of the present invention, in a display process of a navigation apparatus for displaying a vehicle symbol indicating a vehicle having the navigation apparatus, based on positional information acquired by the GPS and node-based altitude data, an altitude of the navigation apparatus or an altitude of a vehicle having the navigation apparatus is calculated, and vehicle symbol data in which information of the calculated altitude is set as a parameter for three-dimensional display information is generated and output to a display. Thus, this eliminates a state in which the vehicle symbol is displayed in the air or is displayed in the ground, and enables a display form which matches three-dimensionally drawn data and which is along the road.

According to an embodiment of the present invention, processing is employed in which altitudes not less than an altitude are set as an allowable range in which a camera viewpoint is set, and three-dimensional data obtained in observation from a camera viewpoint set in the allowable range is generated and output to a display. Thus, it is ensured that an altitude at which the camera viewpoint is set is set at a position not lower than a vehicle having a navigation apparatus. Accordingly, such an unnatural setting state that the camera viewpoint sinks into the ground is prevented. This makes it possible to display three-dimensionally drawn data obtained in observation from a natural position.

According to an embodiment of the present invention, a configuration is employed in which altitude information of interpolation points set between nodes is stored as interpolation-point-based altitude data, the altitudes of the points are calculated based on the interpolation-point-based altitude data, and three-dimensional route information in which data of the calculated altitudes is set as a parameter, or vehicle symbol information, is generated and output to a display section. Thus, even if an altitude between nodes changes, the configuration prevents such unnatural drawing that route information displayed on three-dimensional map graphic data representing the actual altitude information, or the position of a vehicle symbol sinks into the ground or floats in the air. Accordingly, the route information or the vehicle symbol can be displayed at an appropriate position on the road.

According to an embodiment of the present invention, a configuration is employed in which, in altitude information of interpolation points set among nodes, the altitude of one interpolation point of a set of two adjacent interpolation points whose altitudes have a difference not greater than a threshold value of difference is stored as interpolation-point-based altitude data. Thus, this makes it possible to reduce stored data.

BRIEF DESCRIPTION OF THE DRAWINGS

FIG. 5 is an illustration of the detailed configuration of altitude data stored in the navigation apparatus according to the embodiment of the present invention;

DESCRIPTION OF THE PREFERRED EMBODIMENTS

Figure 1:
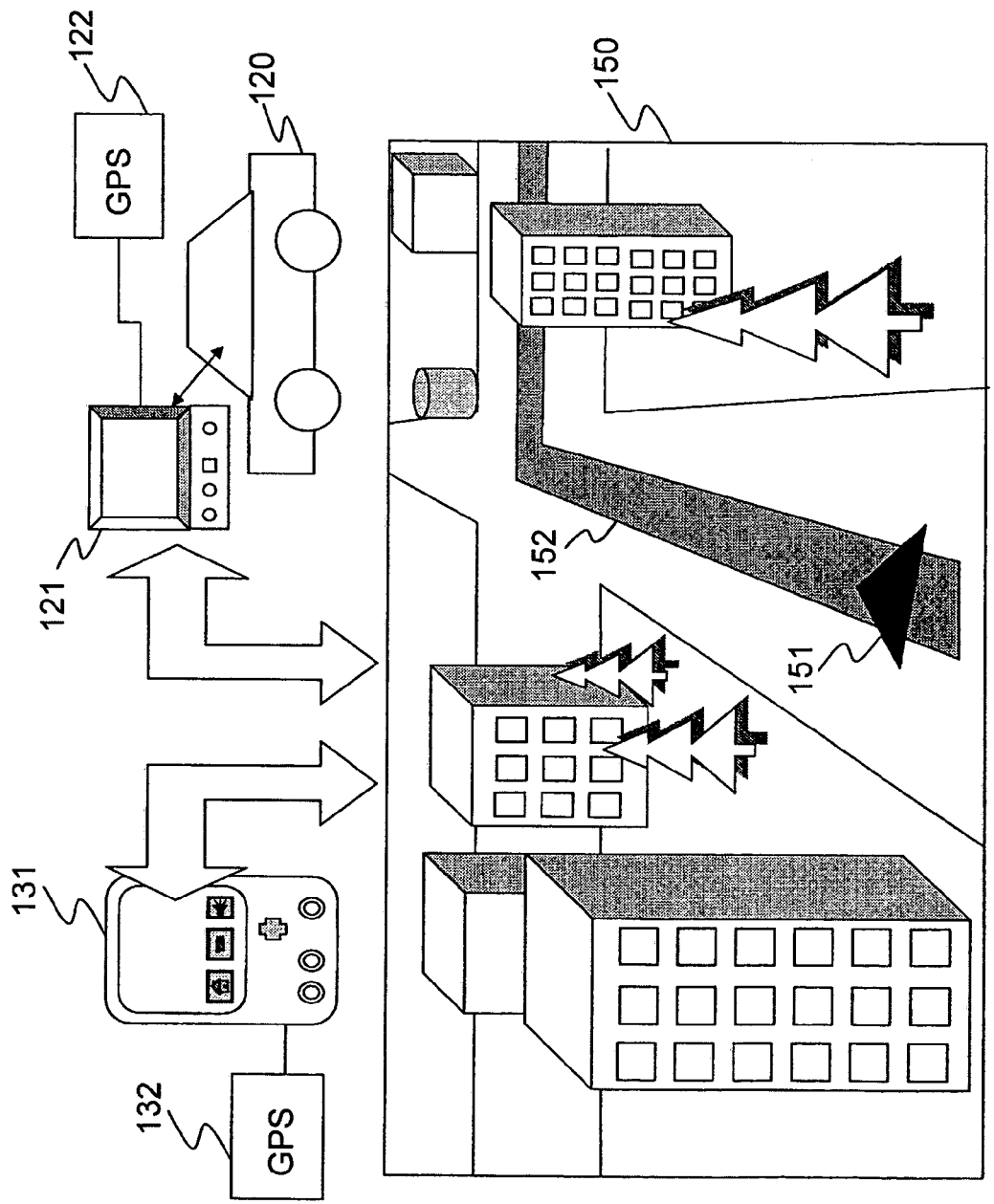
FIG. 1 is an illustration of an overview of a navigation apparatus according to an embodiment of the present invention and examples of display data.

Details of a navigation apparatus, data processing method, and computer program according to embodiments of the present invention are described below with reference to the accompanying drawings.

At first, an overview of the navigation apparatus according to the embodiment of the present invention is described with reference to FIG. 1. This navigation apparatus is usable as a car navigation apparatus 121 provided in, for example, an automobile 120. Also, this navigation apparatus can be realized as a portable terminal 131 such as a personal digital assistant (PDA), a cellular phone, or a portable personal computer.

The car navigation apparatus 121 includes a GPS component 122 and the portable terminal 131 includes a GPS component 132. Each of the car navigation apparatus 121 and the portable terminal 131 acquires positional information based on externally input information.

A display of each of the car navigation apparatus 121 and the portable terminal 131 displays the three-dimensional information 150 shown in FIG. 1. The three-dimensional information 150 shown in FIG. 1 is an example of data displayed when an automobile having the navigation apparatus according to the embodiment of the present invention heads for a crossing.

The display displays buildings, etc., near the crossing in three-dimensional graphic form, displays symbol data of the automobile which represents its position, that is, a vehicle symbol 151, in animated form, and displays, in a form along the road, route information 152 generated in accordance with destination information input by the user beforehand. Although this description exemplifies a navigation apparatus for the automobile, an embodiment of the present invention is applicable to also a portable terminal held by a pedestrian. In this case, the vehicle symbol 151 is set as a user symbol serving as positional information of the user holding the portable terminal 131.

Positional information of the automobile and the user is acquired by using externally input three-dimensional positional information such as GPS information. The vehicle symbol 151, used as the symbol data displayed in animated form on the three-dimensional display information 150, is displayed based on the acquired information. By calculating a route starting from the vehicle symbol 151 to a destination, the route information 152 is displayed.

The three-dimensional display information 150 shown in FIG. 1 is such that an image viewed from a camera viewpoint is displayed as three-dimensional data. The camera viewpoint is switched to a plurality of viewpoint positions such as a driver's viewpoint corresponding to the position of a driver, and a bird's view corresponding to a midair viewpoint. Accordingly, three-dimensional data of an image viewed from the set viewpoint position is displayed.

Next, the hardware configuration of the navigation apparatus according to the embodiment of the present invention is described below with reference to FIG. 2. The navigation apparatus according to the embodiment of the present invention includes a GPS component 211, a vehicle-velocity-pulse information input unit 212, a data processor 200, a storage section 213, an input section 214, and a display device 221.

The data processor 200 includes a three-dimensional graphic drawing engine 201, a random access memory (RAM) 202, a read-only memory (ROM) 203, a central processing unit (CPU) 204, and an interface 205.

The GPS component 211 acquires present position information and inputs the acquired information to the data processor 200. The vehicle-velocity-pulse information input unit 212 calculates a vehicle velocity and inputs vehicle-pulse information to the data processor 200.

The data processor 200 uses the interface 205 to receive both information, and generates display data by executing data processing based on information such as various types of information stored in the storage section 213 and destination information input through the input section 214 by the user.

The data processor 200 includes the CPU 204, which controls the entire apparatus operation, the RAM 202, the ROM 203, the three-dimensional graphic drawing engine 201, and the interface 205.

The CPU 204 executes a navigation program and other computer programs under an execution environment provided by an operating system. The CPU 204 performs acquiring the positional information from the GPS component 211 through the interface 205, acquiring the vehicle velocity information from the vehicle-velocity-pulse information input unit 212, reading, from the storage section 213, the map information and three-dimensional geometric information, acquiring the user input through the input section 214, and executing data processing based on the obtained information.

The RAM 202 is a writable semiconductor memory device, and is used to load executing program code for the CPU 204, and to temporarily store work data of the executing program. The ROM 203 is an only-readable semiconductor memory device and eternally stores a start program, programs for operating pieces of hardware, production information, etc.

In response to an instruction from the CPU 204, based on the map information and the three-dimensional geometric information of structures, the three-dimensional graphic drawing engine 201 performs rendering and other types of three-dimensional graphic processing, and outputting generated drawing information on the screen of the display device 221.

The data processor 200 detects the latitude and longitude of the present position based on signals from the GPS component 211, and acquires, from the storage section 213, map information corresponding to the present position or a guidance region in a traveling direction, three-dimensional graphic data, etc. The user uses the input section 214 to designate mode-designating information such as a drawing mode, destination information, etc. After temporarily storing the various types of information, such as map information, in the RAM 202 through the interface 205, the data processor 200 generates various data necessary for three-dimensional data display in accordance with the program executed by the CPU 204. The CPU 204 sends the generated information to the three-dimensional graphic drawing engine 201 in order to perform drawing. The result of drawing is output to the display device 221.

The information generated under the control of the CPU 204 includes the route information and positional information of the vehicle symbol which are described with reference to FIG. 1, and, in addition, viewpoint position information of camera.

Figure 3:
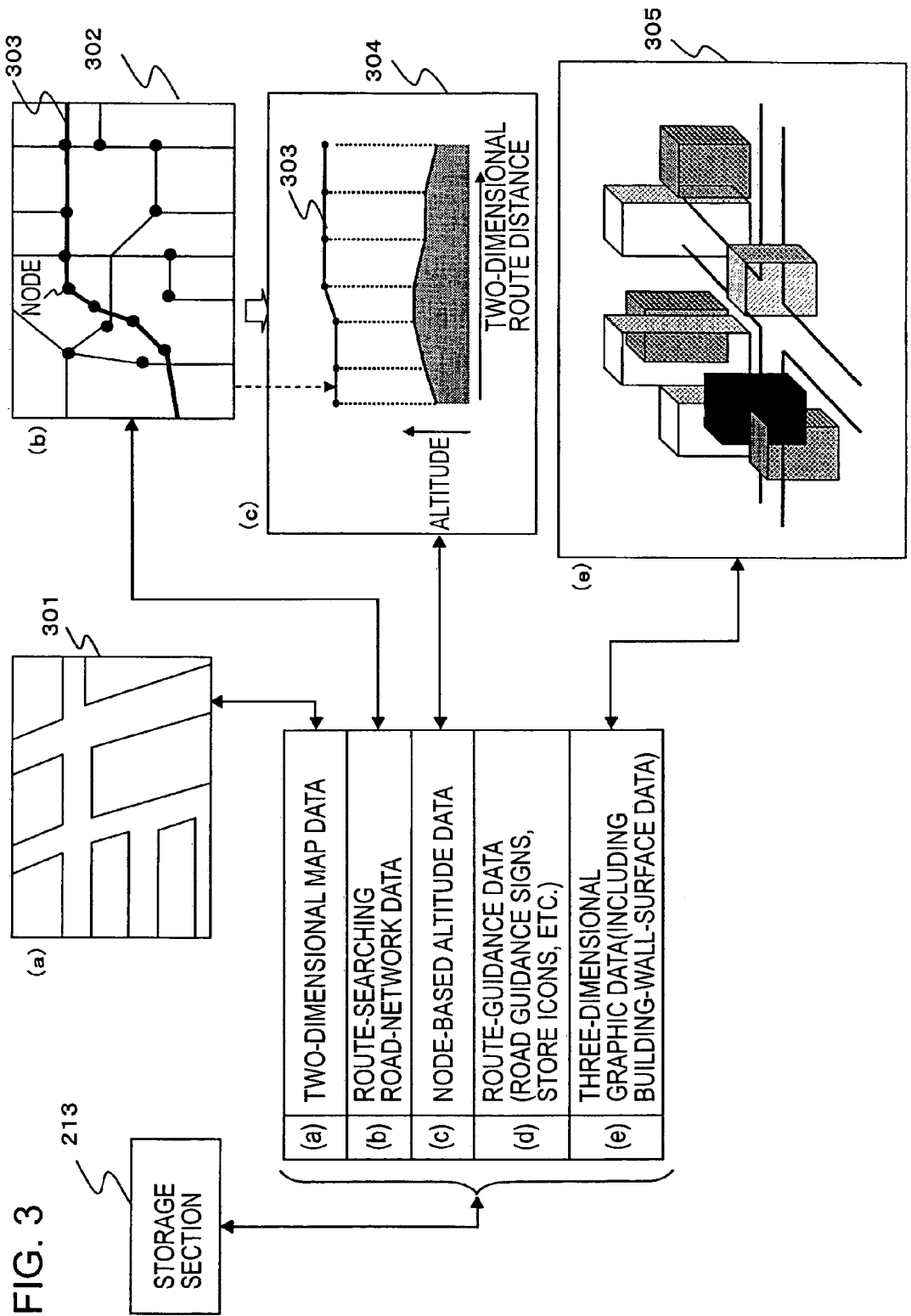
FIG. 3 is an illustration of data stored in a storage section in the navigation apparatus according to the embodiment of the present invention.

Next, details of the information stored in the storage section 213 are described below with reference to FIG. 3. As shown in FIG. 3, the information stored in the storage section 213, which is formed by, for example, a hard disk drive, includes the following information:
(a) two-dimensional map data;
(b) route-search road-network data;
(c) node-based altitude data;
(d) route guidance data (such as road guidance signs and store icons); and
(e) three-dimensional graphic data (including building-wall-surface data).

(a) The two-dimensional map data is common two-dimensional map data 301 as shown in FIG. 3. It is, for example, map information produced by a cartography company. (b) The route-search road-network data is data having two-dimensional road shapes as denoted by reference numeral 302. Each route (road) has data units divided by predetermined nodes (indicated by the filled dots in FIG. 3).

(c) The node-based altitude data is recorded altitude data of nodes in (b) the route-search road-network data. The node-based altitude data 304 shown in FIG. 3 indicates altitude data corresponding to one route 303 in (b) the route-search road-network data 302. (c) The route-based altitude data has altitude data of nodes on all routes included in (b) the route-search road-network data. Details of the node-based altitude data are described later.

(d) The route guidance data is data of, for example, road guidance signs, markers, store icons, etc.

(e) The three-dimensional graphic data is three-dimensional graphic data having three-dimensional information including building shapes and building wall-surface information. (e) The three-dimensional graphic data is used to draw the three-dimensional graphic data 305 shown in FIG. 3.

Figure 4:
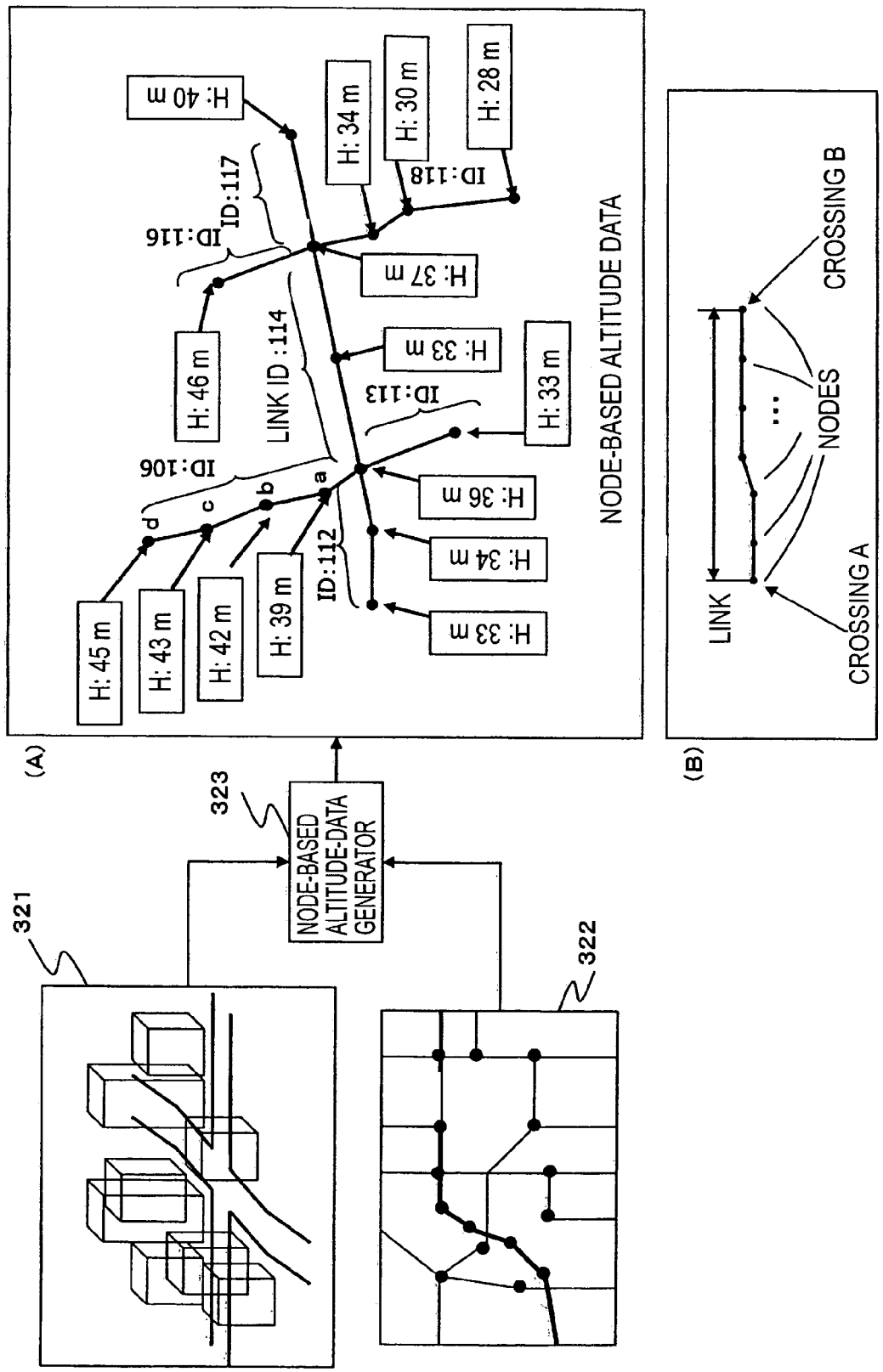
FIG. 4 is an illustration of a process for generating node-based altitude data which is used in the navigation apparatus according to the embodiment of the present invention.

Next, details of (c) the node-based altitude data are described below with reference to FIGS. 4 and 5. FIG. 4 illustrates a process for generating node-based altitude data. The node-based altitude data is generated by a node-based altitude-data generator 323 based on three-dimensional data 321 including altitude data and route-search road-network data 322 generated as two-dimensional including no altitude data.

As shown in portion (A) of FIG. 4, the node-based altitude data is such that the nodes included in the route-search road-network data 322 are associated with corresponding altitude data.

The routes included in the route-search road-network data 322 are divided by links in predetermined units. Each link is set for each identifiable interval in such a manner that, for example, the route from crossings A to B as shown in portion (B) of FIG. 4 is used as one link. An identifier (link ID) is set for each link. The node-based altitude data shown in portion (A) of FIG. 4 includes links whose link IDs are 106, 112, 113, 114, 116, 117, and 118, and has altitude data items of nodes set in these links.

Each link is divided by nodes. The nodes are set correspondingly to connections of a plurality of linear portions constituting the link. The nodes can be variously set depending on data arrangement.

The altitude data is recorded so as be associated with each node on the link. Altitudes are recorded as altitude data so as to be associated with the nodes a, b, c, and d, which has a link ID of 106 in portion (A) of FIG. 4. Specifically, the altitude data is set so that node A has an altitude of 39 m, node B has an altitude of 42 m, node C has an altitude of 43 m, and node D has an altitude of 45 m.

Specific data arrangement of the node-based altitude data are described with reference to FIG. 5. A link quantity storage portion 401 stores the number of links included in specific data. In each link, a link ID is stored as a link ID. Link ID information, and offset information up to each memory position in which altitude data of each node on the link for which each link ID is set are stored in a data storage portion 402.

A data storage portion 403 represents link information corresponding to link ID-1, and a data storage portion 404 represents link information according to link ID-2. Hereinafter, data corresponding to each link is stored.

In the data storage portion 403, a node quantity storage portion 411 included in a link corresponding to link ID-1, and one reference-node-information storage portion 412 selected from links of link ID-1 are stored. The reference-node-information storage portion 412 is set as information including longitude information of a reference node, latitude information of the reference node, and altitude information of the reference node.

The altitude information of the reference node is set in units of 10 cm, with, for example, −1000 meters above sea level as a reference. In the case of a node at 5 meters above sea level, its altitude information is 100500 (cm).

In a data storage portion 413, positional information and altitude data other than those of the reference node on the link of link ID-1 are stored. The information stored in each storage portion serves as offset information for data of the reference node stored in the reference-node-information storage portion 412.

The data shown in FIG. 5 is details of the node-based altitude data stored in the storage section 213. As described above, the storage section 213 stores (a) the two-dimensional map data, (b) the route-search road-network data, (c) the node-based altitude data, (d) the route guidance data (such as road guidance signs and store icons), and (e) the three-dimensional graphic data (including building-wall-surface data). Based on the above data, the navigation apparatus of the embodiment of the present invention generates data to be displayed by the display device 221.

Details of the display data generating process executed by the navigation apparatus of the embodiment of the present invention are described below with reference to FIG. 6 and the subsequent drawings.

Figure 6:
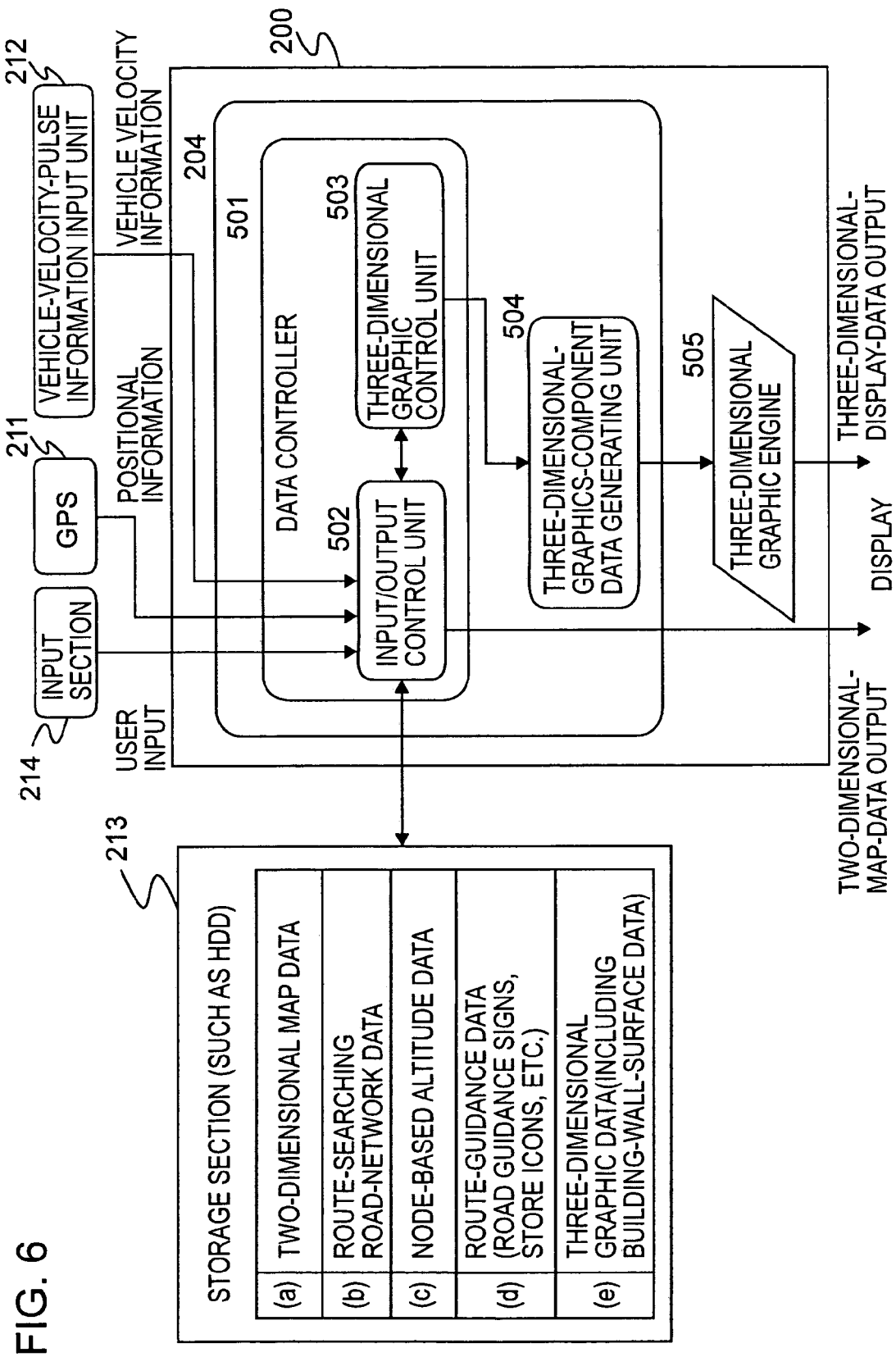
FIG. 6 is an illustration of data processing executed by the navigation apparatus according to the embodiment of the present invention.

FIG. 6 illustrates the data stored in the storage section 213 in the navigation apparatus of the embodiment of the present invention and data processing in the data processor 200.

The data stored in the storage section 213 is input to the data processor 200, if necessary. The data processor 200 performs the display data generating process by executing data processing based on user-input information such as the positional information input from the GPS component 211, the vehicle velocity information input from the vehicle-velocity-pulse information input unit 212, and the destination information input from the input section 214.

The data processor 200 receives the positional information acquired by the GPS component 211, acquires necessary data from the storage section 213 based on the input positional information, generates three-dimensional display information for the guidance region, and outputs the generated information to the display device 221. The data processor 200 calculates the altitude of each point on the route based on the node-based altitude data, which is the data stored in the storage section 213, uses the calculated altitude data as parameter to generate three-dimensional route information, and outputs the generated information to the display device 221.

Based on the positional information acquired by the GPS component 211 and the node-based altitude data, the data processor 200 performs calculating the altitude of the navigation apparatus or the automobile provided with the navigation apparatus, using the calculated altitude information as parameter of the three-dimensional display information to generate a vehicle symbol, which is symbol data of the apparatus or vehicle, and outputting the generated vehicle symbol to the display device 221. In addition, by using, as an allowable setting range in which the camera viewpoint is set, altitudes not lower than the altitude of the automobile having the navigation apparatus, the data processor 200 executes generating three-dimensional data obtained in observation from the camera viewpoint set in the allowable setting range, and outputting the generated data to the display device 221.

FIG. 6 shows processing executed by the CPU 204 in the data processor 200 in functionally divided form. The CPU 204 includes a data controller 501 and a three-dimensional-graphic-component data generating unit 504. An input/output control unit 502 receives the data stored in the storage section 213, the positional information from the GPS component 211, the vehicle velocity information from the vehicle-velocity-pulse information input unit 212, and the user-input information from the input section 214. These data are input to the three-dimensional-graphic-component data generating unit 504 through a three-dimensional graphic control unit 503. The three-dimensional-graphic-component data generating unit 504 generates three-dimensional-graphic component data. The generated data is output and processed in a three-dimensional graphic engine 505 by three-dimensional-data drawing processing. The processed data is output to the display device 221.

The data processor 200 detects the longitude and latitude of the present position based on the signals from the GPS component 211, and acquires, from the storage section 213, various data including the present position, that is, (a) the two-dimensional map data, (b) the route-search road-network data, (c) the node-based altitude data, (d) the route guidance data (such as road guidance signs and store icons), and (e) the three-dimensional graphic data. The data processor 200 calculates the route to the destination based on the vehicle velocity information from the vehicle-velocity-pulse information input unit 212 and the user-input information from the input section 214, also acquires altitude information of the node corresponding to the route, and outputs the above types of information to the three-dimensional-graphic-component data generating unit 504.

Based on the data received from the data controller 501, the three-dimensional-graphic-component data generating unit 504 generates data necessary for drawing, that is, three-dimensional-graphic component data. The generated data includes viewpoint position information of camera, route information, and vehicle-symbol information, and these data are generated as data based on the altitude information.

Details of a camera-viewpoint-position setting process, route information drawing process, and vehicle-symbol-information drawing process executed by the data processor 200, based on the route information, are described below with reference to FIGS. 7 and 8.

Figure 7:
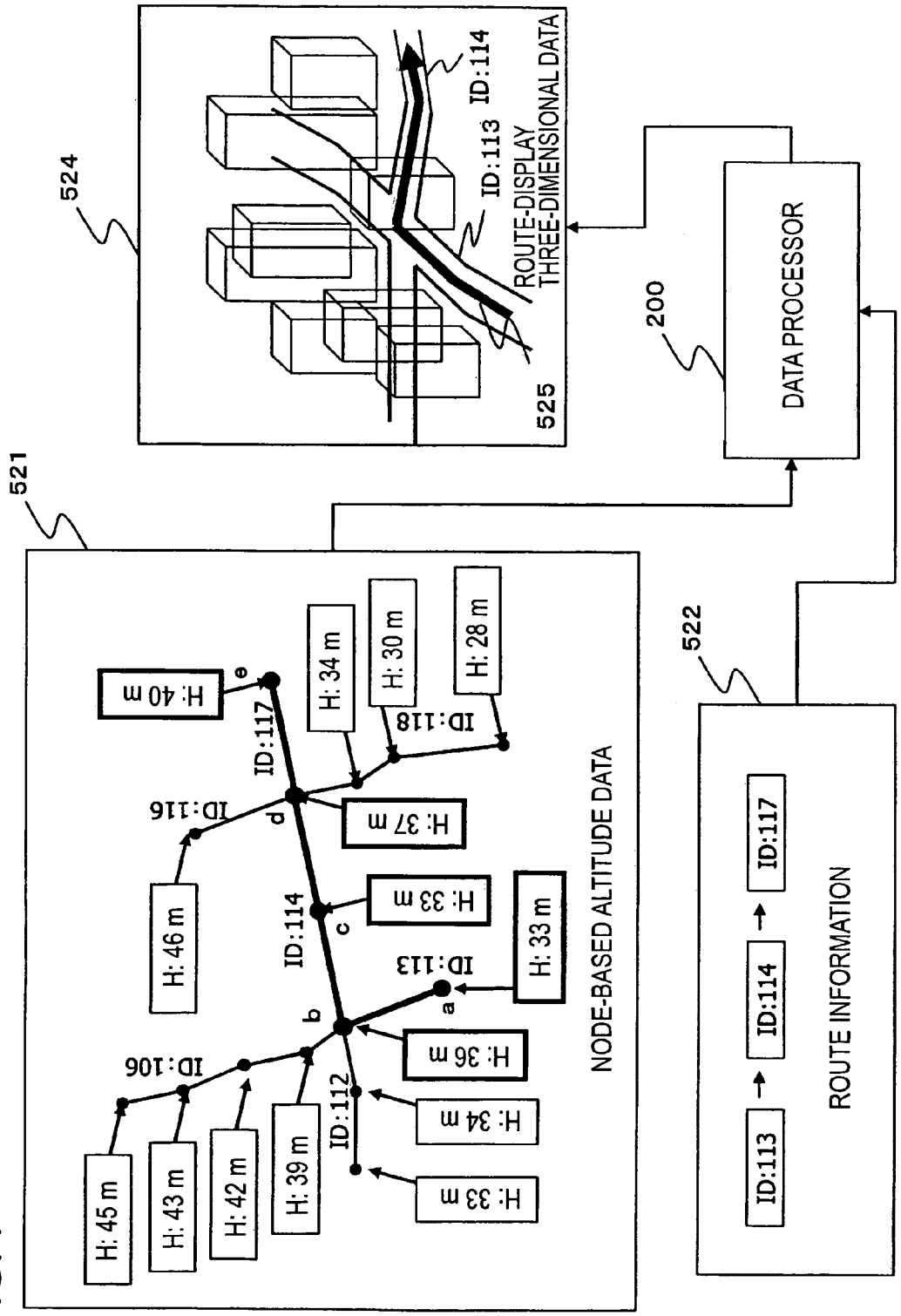
FIG. 7 is an illustration of details of a route information display process executed by the navigation apparatus according to the embodiment of the present invention.

FIG. 7 illustrates a route-display three-dimensional data drawing process executed by the data processor 200.

The data processor 200 acquires node-based altitude data 521 and route information 522 from the storage section 213. The node-based altitude data 521 is information corresponding to a region including the present position detected by the GPS component 211. The node-based altitude data 521 corresponds to the node-based altitude data shown in portion (A) of FIG. 4. The route information 522 is data corresponding to the route to the destination input by the user, and is link ID sequence data.

The data processor 200 generates route-display three-dimensional data 524 based on these data and outputs the generated route-display three-dimensional data 524 as display data for the display device 221.

For example, as shown in FIG. 7, link ID sequence input as the route information 522 is "[ID:113]→[ID:114]→[ID:117]". The data processor 200 acquires altitude data of nodes on the route set by this link ID sequence.

In the example shown in FIG. 7, altitude data of nodes a to e that exist on the route of "[ID:113]→[ID:114]→[ID:117]". Specifically, based on the node-based altitude data shown in FIG. 5, the altitudes of the nodes are calculated. In the example shown in FIG. 7, node a has an altitude of 33 m, node b has an altitude of 36 m, node c has an altitude of 33 m, node d has an altitude of 37 m, and node e has an altitude of 40 m.

The data processor 200 generates three-dimensional graphic component data based on the altitude data of each node. FIG. 7 shows a state in which, based on the altitude data of the nodes, the route information 525 is drawn in three-dimensional data. By associating the altitude data with the route information 522 based on the node-based altitude data, which is the data stored in the storage section 213, the data processor 200 generates three-dimensional route information having the altitude data as parameter and outputs the generated information to the display device 221.

As shown in the route-display three-dimensional data 524 in FIG. 7, the route information 525 is drawn having a shape which changes in altitude depending on changes in altitude of the route (road). This is because the altitude information of nodes a to e is used as component data for drawing the route information 525. In the relate art, since two-dimensional data is used to execute drawing of the route information 525, it is difficult to match the two-dimensional data with three-dimensionally drawn data, so that drawing may be performed in such unnatural form that the route information 525 is drawn in the air or penetrates the ground. In the embodiment of the present invention, the route information 525 is formed as data storing altitude data. Thus, the two-dimensional data is matched with three-dimensional drawing data used as background data, and a route in which difference in altitude is recognizable in three-dimensional data form is displayed.

Next, the camera-viewpoint-position setting process and symbol-information drawing process executed by the data processor 200 are described with reference to FIG. 8. These processes are executed while considering the altitude data. A camera 612 represents a virtual viewpoint position, and three-dimensional data of an image viewed from the camera 612, which is at a set position.

The navigation apparatus of the embodiment of the present invention calculates the altitude of the vehicle having the navigation apparatus. The vehicle symbol 611 shown in FIG. 8 corresponds to the vehicle having the navigation apparatus. The altitude of the vehicle changes along the route. A route altitude 621 changes along the straight line connecting the altitudes of two nodes on the route. In other words, as shown in FIG. 8, when the vehicle goes from node A to node B, the altitude of the vehicle changes from the altitude [$H_a$] of node A to the altitude [$H_b$] of the node B.

The altitude of the vehicle is calculated by the following expression:

$$H_{car} = H_a + (H_b - H_a) \times (L_{ac}/L_{ab})$$

where $H_{car}$ represents the altitude of the vehicle, $H_a$ represents the altitude of node a, $H_b$ represents the altitude of node b, $L_{ab}$ represents the distance between node A and node B, and $L_{ac}$ represents the distance between node A and the vehicle.

The altitude [$H_a$] of node A and the altitude [$H_b$] of node B are already known since both are stored in the storage section 213, as described above. The distance [$L_{ab}$] between node A and node B can be acquired based on the map data. The distance [$L_{ac}$] between node A and the vehicle is a value that can be calculated based on the map data and the present position information of the vehicle acquired from the GPS. Accordingly, the altitude of the vehicle can be calculated by the above expression.

The altitude data of the vehicle calculated by the above expression is used in the vehicle-symbol-information drawing process. In other words, the data processor 200 executes generating a vehicle symbol data in which the altitude data calculated by the above expression is set as a parameter for three-dimensional information, and outputting the generated information to the display device 221.

Figure 8:
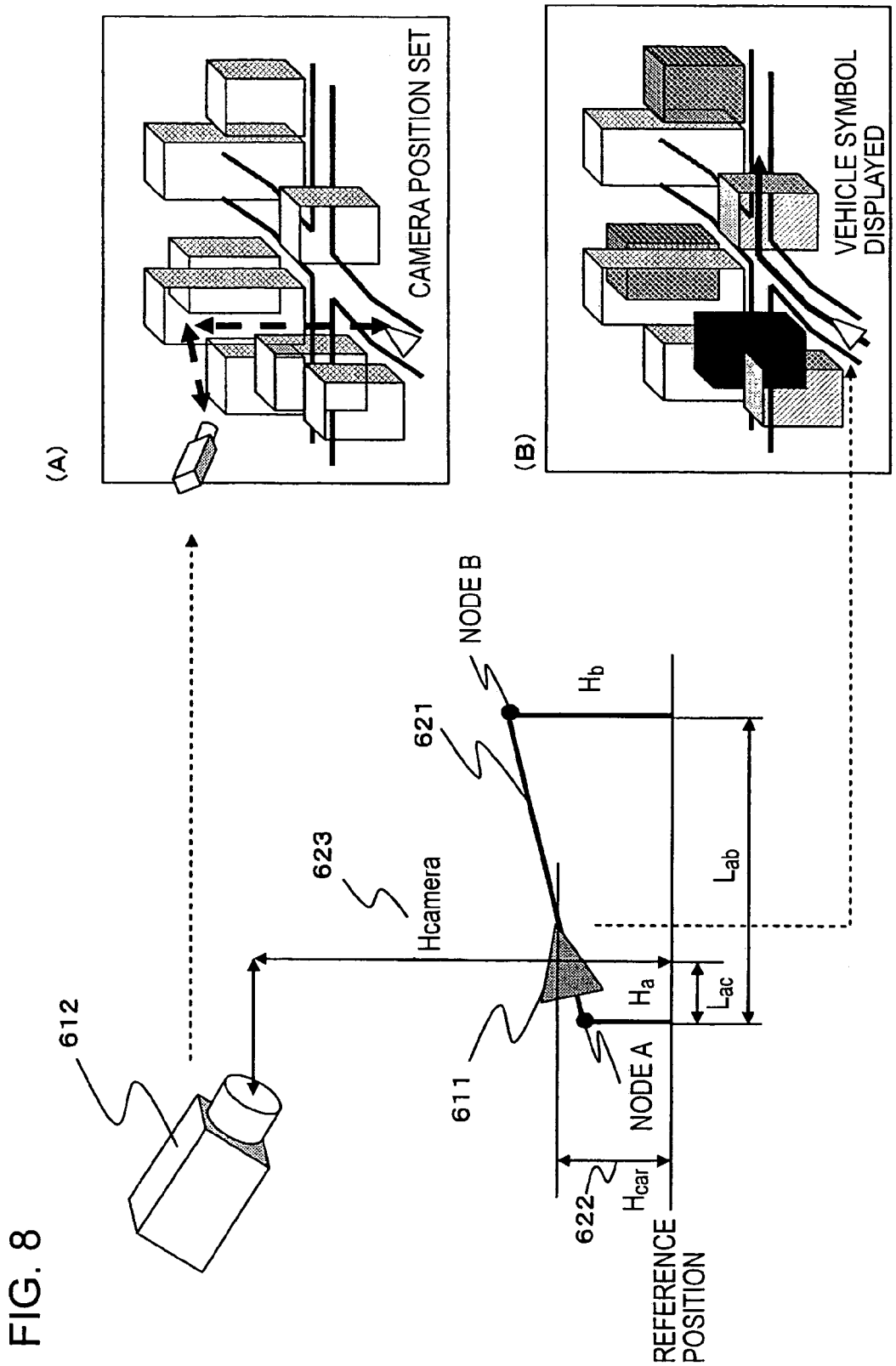
FIG. 8 is an illustration of details of a camera position setting process and vehicle symbol display process executed by the navigation apparatus according to the embodiment of the present invention.

As a result, as shown in portion (B) of FIG. 8, the vehicle symbol matches three-dimensional drawing data used as background data, and an image having the vehicle symbol along the route (road) is displayed. In other words, the vehicle symbol is displayed in a form along the road without displaying the vehicle symbol in the air or displaying the vehicle symbol in the ground.

In addition, the camera position is set so that the camera-viewpoint-position setting altitude [$H_{camera}$] 623 is equal to or greater than the vehicle altitude [$H_{car}$] 622. In other words, an altitude that satisfies the expression $H_{camera} \geq H_{car}$ is used as a camera-viewpoint-setting allowable position. Three-dimensional data of an image viewed from the camera viewpoint set in the setting allowable position is generated and output to the display device 221.

The setting allows the camera-viewpoint-position setting altitude to be equal to or greater than the vehicle altitude [$H_{car}$] 622, thus preventing such unnatural setting state that the camera viewpoint position sinks into the ground.

As a result, as shown in portion (A) of FIG. 8, the camera viewpoint position is set to be equal to or higher than the vehicle altitude, and three-dimensional data of an image viewed from the set position is generated and displayed.

Next, a process executed by the navigation apparatus according to the embodiment of the present invention is described with reference to the flowchart shown in FIG. 9.

Figure 9:
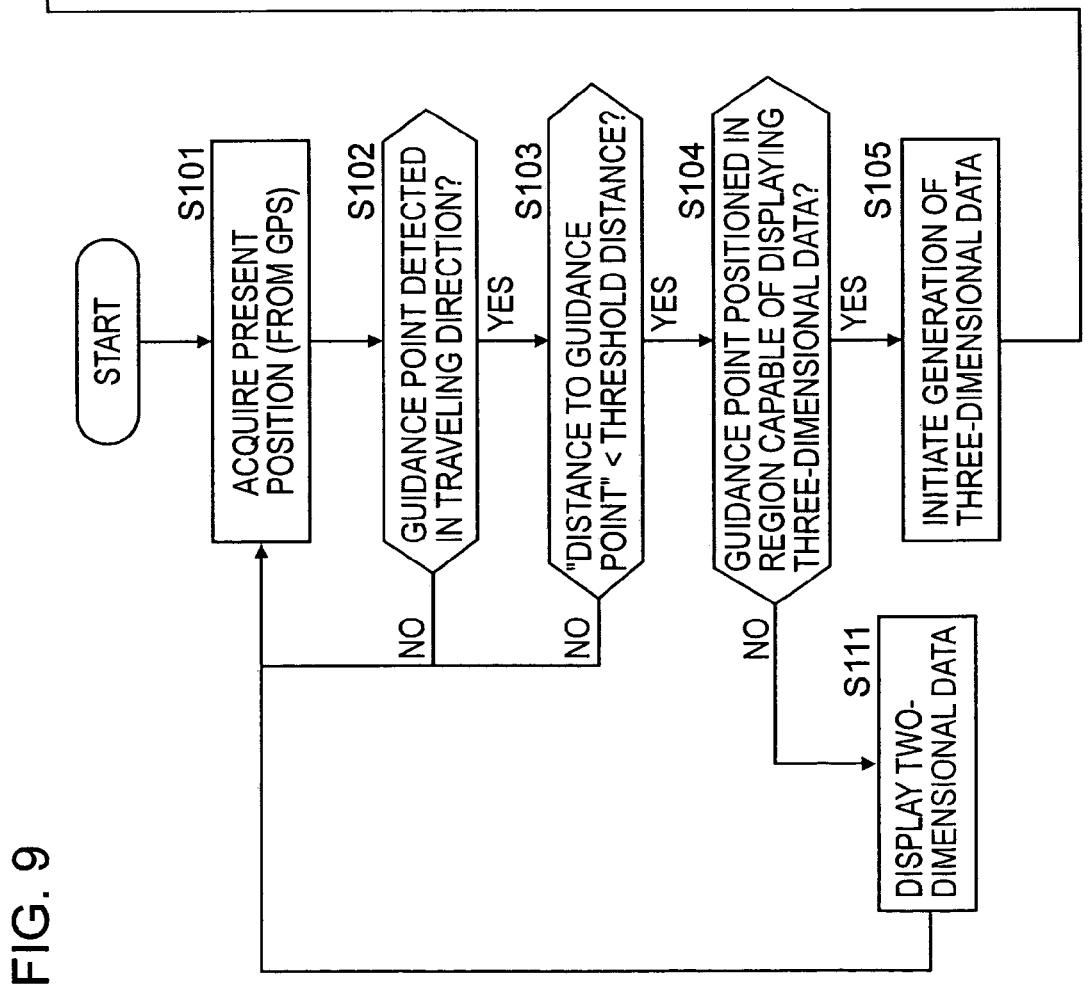
FIG. 9 is a flowchart illustrating a processing sequence executed by the navigation apparatus according to the embodiment of the present invention.

The process shown in FIG. 9 is executed by the navigation apparatus, to which destination information has already been input, and which receives periodically input vehicle velocity information and input GPS information.

In step S101, present position information is acquired from the GPS. In step S102, it is determined whether a guidance point is detected in the traveling direction of the vehicle. The guidance point is a specific spot on the map with which data to be displayed on the display is associated, for example, a crossing or the like. If no guidance point is detected in the traveling direction of the vehicle, the process returns to step S101 and continues to acquire the present position information.

If, in step S101, it is determined that the guidance point is detected, the process proceeds to step S103, it is determined whether the distance from the vehicle to the guidance point (e.g., a crossing) is equal to or less than a threshold value set beforehand. In step S103, it is determined whether the guidance point (e.g., a crossing) comes within the threshold distance from the present position of the vehicle, for example, 300 meters ahead. If the guidance point does not come within the threshold distance, the process returns to step S101 and continues to acquire the present position information.

If, in step S103, it is determined that the guidance point comes within the threshold value, the process proceeds to step S104 and it is determined whether the guidance point is positioned in a region capable of displaying three-dimensional data. In other words, it is determined whether three-dimensional graphic data is a guidance point stored in the storage section 213.

If the guidance point is not positioned in the region capable of displaying three-dimensional data, the process proceeds to step S111, and the two-dimensional data stored in the storage section 213 is displayed on the display.

If the guidance point is positioned in the region capable of displaying three-dimensional data, the process proceeds to step S105, and generation of three-dimensional data corresponding to the guidance point is initiated. For generating the three-dimensional data, steps S106 to S110 are executed.

Figure 10A:
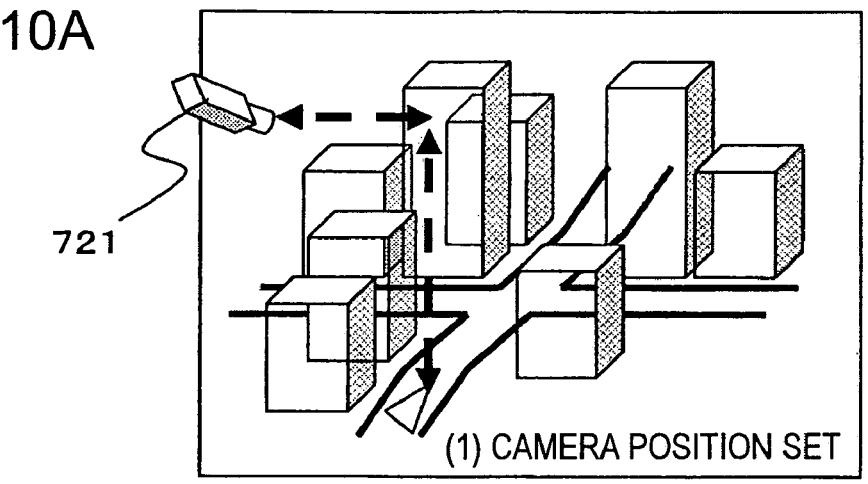
FIGS. 10A, 10B, 10C, 10D, and 10E are illustrations of examples of data items generated by the navigation apparatus according to the embodiment of the present invention.

Steps S106 to S110 are described with reference to FIGS. 10A to 10E. In step S106, the camera viewpoint position is set based on the altitude data at the vehicle position. This is executed, as described above with reference to FIG. 8, the vehicle altitude is calculated based on altitude data of the node and the camera position is set at a point whose altitude is equal to or higher than the vehicle altitude. As shown in FIG. 10A, the position of a camera 721 is determined.

Figure 10B:
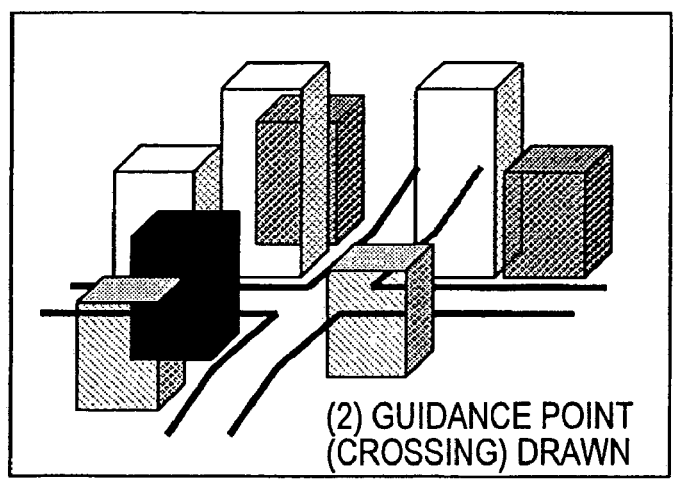

In step S107, three-dimensional data of a guidance point, for example, a crossing, which is viewed from the set camera position, is generated and displayed. The three-dimensional data of the guidance point (crossing), shown in FIG. 10B is displayed on the display device 221.

In step S108, route information is displayed in animated form on the three-dimensional display information. As described above with reference to FIG. 7, three-dimensional data of route information in which, based on node-based altitude data and route information, altitude data is set as a parameter for the route information is generated and displayed.

Figure 10C:
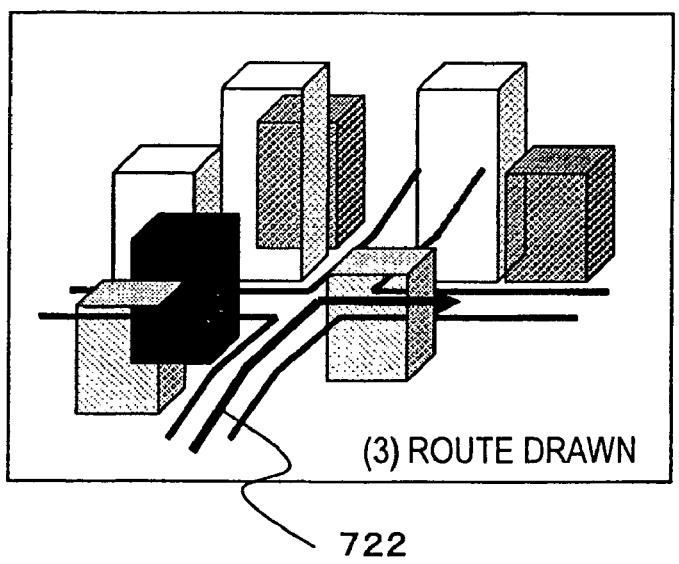

In other words, based on the node-based altitude data, the altitude of each point on the route is calculated, and three-dimensional route information in which data of the calculated altitudes is set as a parameter is generated and output to the display device 221. By performing step S108, the route information 722 shown in FIG. 10C is displayed. The route information 722 serves as data matching the three-dimensional data displayed on the display, and is displayed as data indicating changes in altitude in the traveling direction.

Figure 10D:
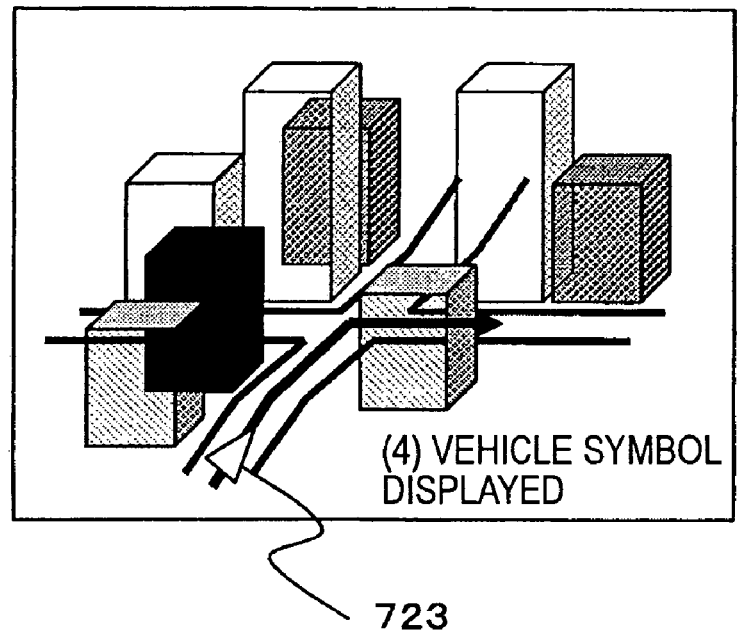

In step S109, the vehicle symbol is drawn in the three-dimensionally-displayed information. Display of the vehicle symbol is executed in accordance with the process described above with reference to FIG. 8. In other words, the altitude of the vehicle is calculated based on altitude information of node, and vehicle symbol data, used as three-dimensional display information in which the calculated altitude information is set as a parameter for three-dimensional display information, is generated and displayed. As a result, as shown in FIG. 10D, a vehicle symbol 723 matching the route (road) setting position in the three-dimensional display information is displayed as shown in FIG. 10D.

Figure 10E:
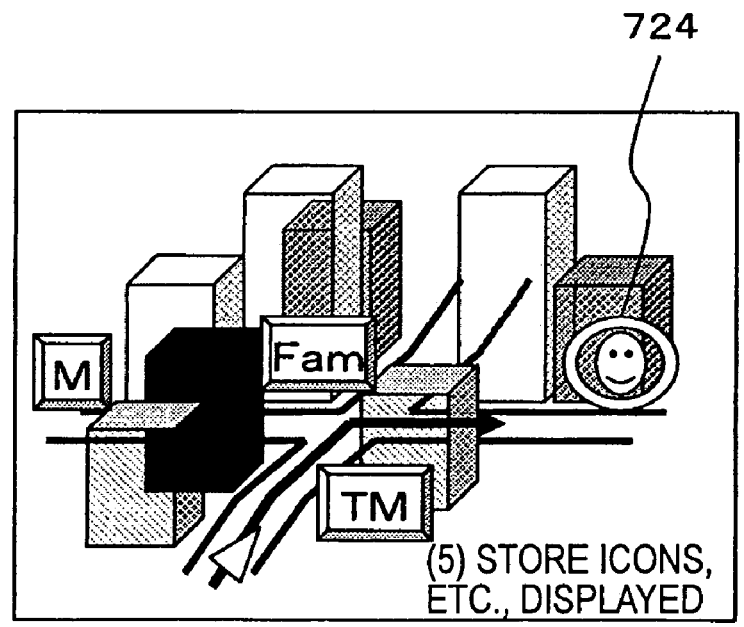

In step S110, additional information, such as store icons and road signs, is drawn in the three-dimensional data. As shown in FIG. 10E, an icon 724 is displayed.

With the above steps which have been described, display of the three-dimensional data, which includes the route information and the vehicle symbol, finishes. The execution sequence of steps S106 to S110 does not necessarily need to be the sequence given. Steps S106 to S110 may be executed in a different sequence or in parallel.

Example of Setting Interpolation Point Between Nodes

Next, an example in which an interpolation point is set between nodes is described. The above-described embodiment describes a case in which a link is divided by nodes, and the nodes are set correspondingly with, for example, connections on a plurality of linear portions constituting the link, and in which, from two-dimensional map data, features, such as turnings and crossings, are extracted and set as nodes, and altitude data corresponding to the set nodes is used.

Such a node setting technique has a problem in that, when there is a large difference in altitude on the route between two adjacent nodes, the route information or vehicle symbol drawn on the display floats in the air or sinks into the ground. A specific example in which this problem occurs is described with reference to FIG. 11.

Figure 11:
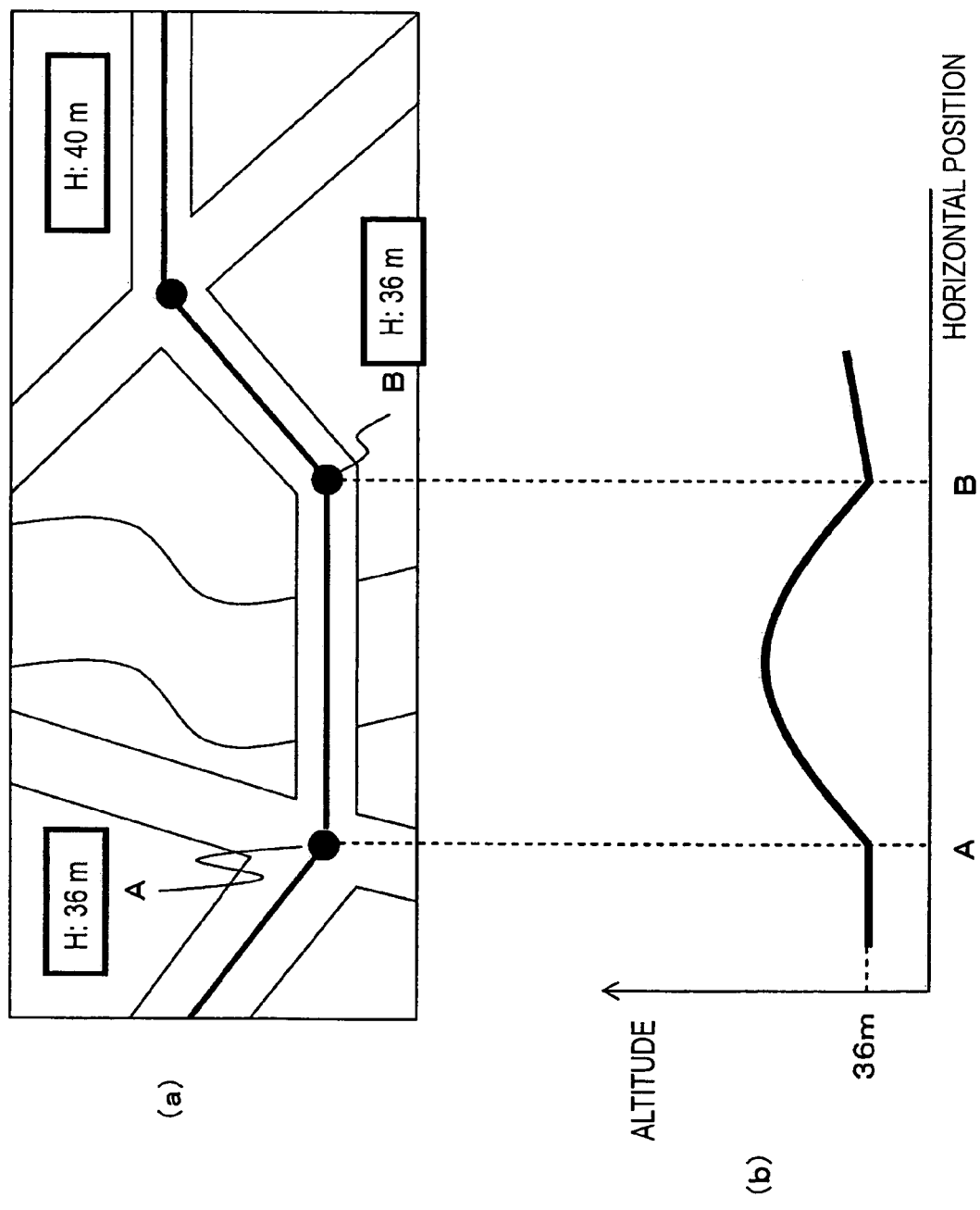
FIG. 11 is an illustration of a problem caused by a change in altitude between nodes.

Portion (a) of FIG. 11 shows two-dimensional map, and crossings or changes in straight line are indicated by nodes (indicated by the filled dots in FIG. 11). For example, there is a straight line between nodes A and B, and no crossing or the like exists therebetween. Accordingly, no node is set at the midpoint between nodes A and B. An altitude of 36 meters of node A and an altitude of 36 meters of node B are recorded as node information. Based on the node information of both nodes, route information and vehicle symbol position are displayed on the display device 221, which displays three-dimensional information.

However, there may be case in which nodes A and B have a high central portion, for example, a heightwise curved bridge. Portion (b) of FIG. 11 shows changes in altitude between nodes A and B. Although both nodes A and B are positioned at an altitude of 36 meters, the route between nodes A and B may be such a bridge that the central portion between both nodes is raised to have an length of 40 meters. In addition, conversely, when nodes A and B have an underground tunnel therebetween, the route between both nodes is such that the central portion between both nodes is lower in position than both nodes.

In this case, in the case of displaying route information and vehicle symbol position by using the altitude information of nodes A and B, that is, 36 meters, all the points of the route between nodes A and B are drawn to have an altitude of 36 meters. Accordingly, this causes such unnatural drawing that route information and vehicle symbol position, displayed on three-dimensional map graphic data reflecting the actual altitude information, may sink into the ground, or may float in the air.

Figure 12:
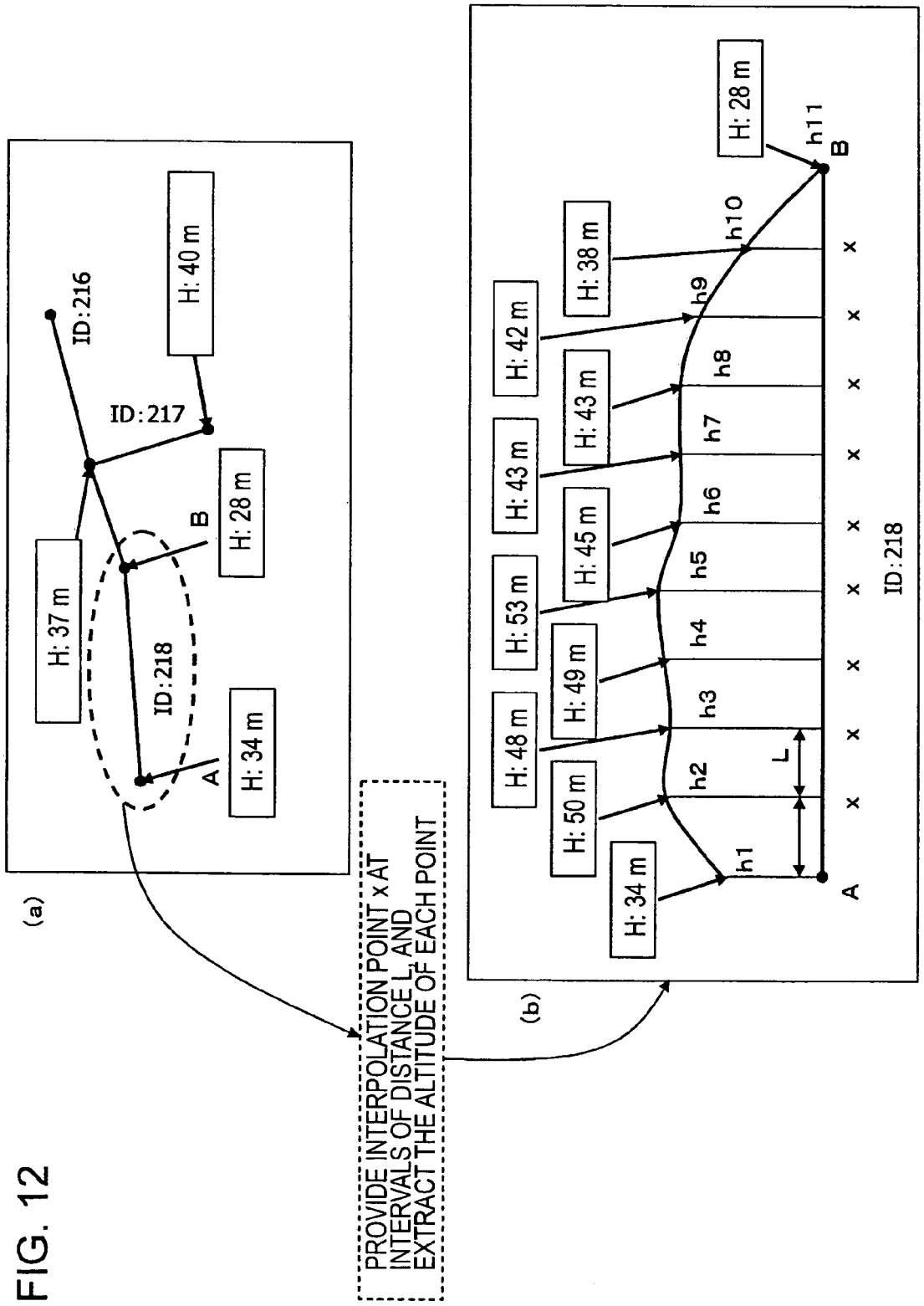
FIG. 12 is an illustration of an example in which an interpolation point is set between nodes and altitude information of the interpolation point is stored.

A technique for prevents the unnatural drawing is described with reference to FIG. 12. Portions (a) of FIG. 12 is a two-dimensional diagram including nodes A and B of a link ID 218. Node A has an altitude of 34 meters and node B has an altitude of 28 meters.

The graph in portion (b) of FIG. 12 shows altitude information of altitudes between nodes A and B. The altitude information is acquired from the three-dimensional map data. In this embodiment, the route between nodes A and B is divided by certain distance L, points of division are set as interpolation points x, and altitude information of each interpolation point is stored. In the example shown in portion (b) of FIG. 12, nine interpolation points are set between nodes A and B, and two pieces of altitude information of nodes A and B and nine pieces of altitude information of the interpolation points, that is, eleven pieces of altitude information are stored in total. The altitude information items of the interpolation points are stored in the storage section 213 in FIG. 2. In the example shown in FIG. 3, the altitude information is stored as interpolation-point-based altitude data related to (c) the node-based altitude data so as to be associated with altitude data of nodes.

In the case of displaying route information and vehicle symbol on three-dimensional graphic data reflecting the actual altitude data, based on not only altitude information of nodes, but also altitude information of interpolation points, that is, the interpolation-point-based altitude data, display positions are determined and displayed. This processing prevents such unnatural drawing that route information and vehicle symbol position displayed on three-dimensional map graphic data reflecting the actual altitude information sink into the ground or float in the air, so that the route information and vehicle symbol position can be displayed at appropriate positions on the road.

Figure 2:
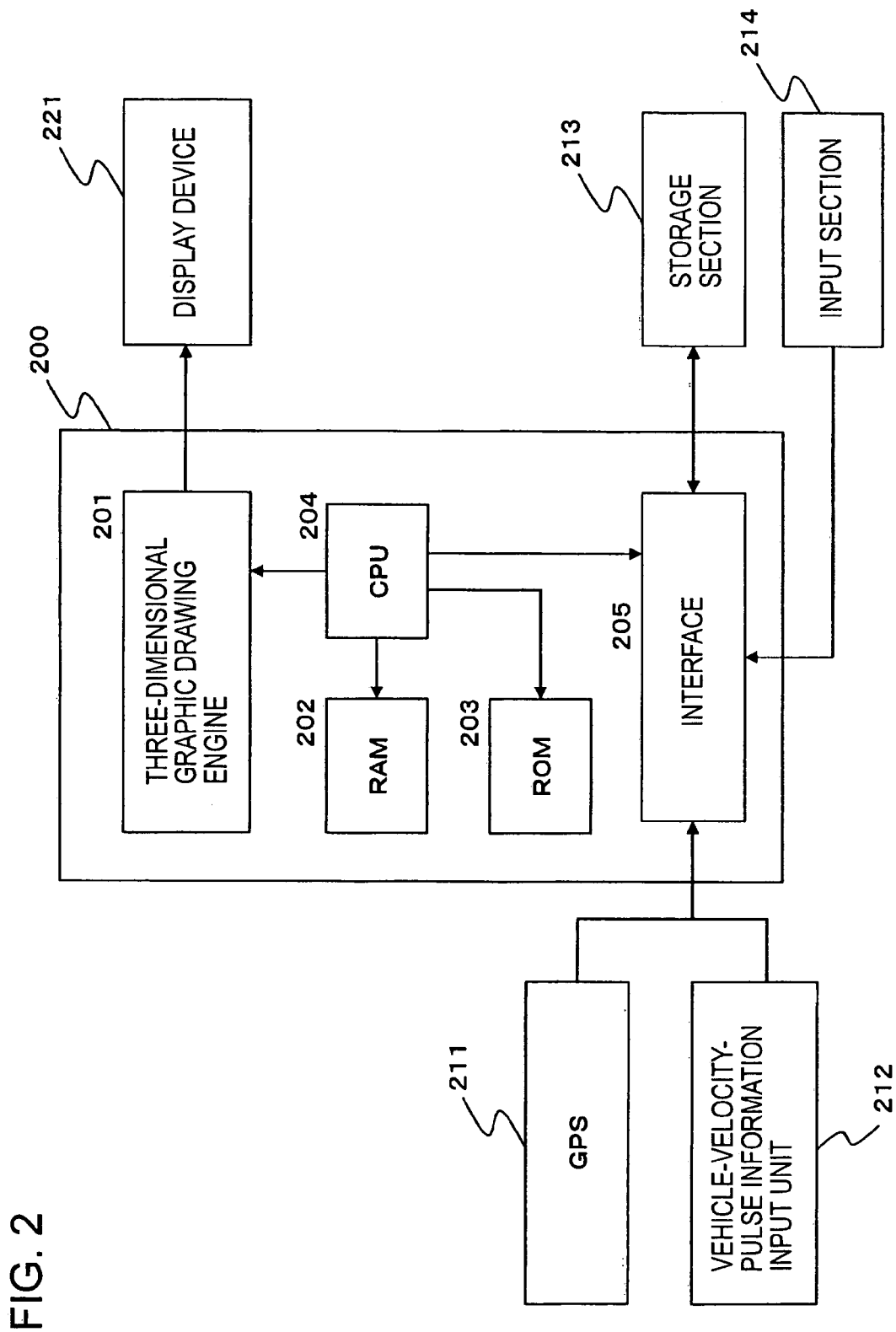
FIG. 2 is a block diagram illustrating an example of the hardware configuration of the navigation apparatus according to the embodiment of the present invention.

In the example shown in FIG. 12, a node is divided by certain distance L, points of division are set as interpolation points x, and altitude information of all the interpolation points is stored in the storage section 213 (see FIG. 2). If the storage section 213 has sufficient storage capacity, this data storage configuration is possible. However, since the storage capacity of the storage section 213 is limited, it is preferable to reduce stored data as much as possible.

Figure 13:
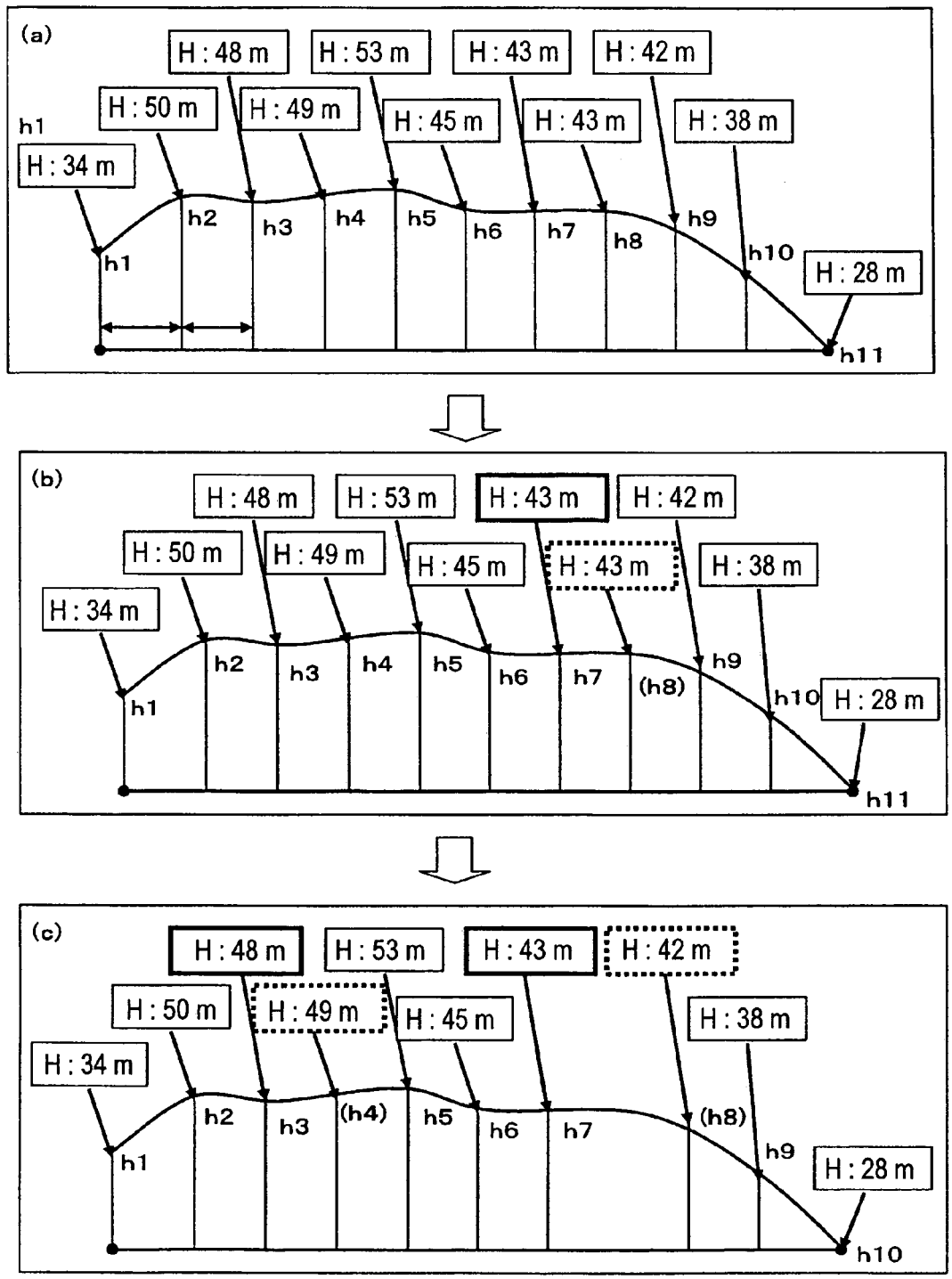
FIG. 13 is an illustration of an example of data reduction in the example in which the interpolation point is set between nodes and altitude information of the interpolation point is stored.

Data reduction is described with reference to FIG. 13. Portion (a) of FIG. 13 shows an example of setting interpolation points between nodes A and B, which are described with reference to portion (b) of FIG. 12. In the case of the data shown, two pieces of altitude information of nodes A and B, and nine pieces of altitude information of the interpolation points, that is, eleven pieces of altitude information are stored in total.

Portion (b) illustrates a first example of data reduction. In portion (b) of FIG. 13, altitude information (H:43 m) of one interpolation point (h8) is excluded from data to be stored. Altitude information to be excluded from data to be stored is selected based on the following rules. Interpolation points are sequentially arranged along two-dimensional positions and numbered. As shown in portion (b) of FIG. 13, each interpolation point number, is represented by "hn". This example shows interpolation point numbers h2 to h10.

In this case, two sequential interpolation points that satisfy the expression:

$$|Altitude(n+1)-Altitude(n)|=0$$

are extracted. In addition, altitude information of an interpolation point numbered n or n+1 is excluded from data to be stored. In other words, one of sequential interpolation points having the same altitude is excluded from data to be stored.

In the example shown in portion (b) of FIG. 13, interpolation points h7 and h9 are interpolation points that satisfy the condition in the above expression, that is, sequential interpolation points having the same altitude. One of interpolation points h7 and h8 is excluded from interpolation points whose altitudes are to be stored. Although, in portion (a) of FIG. 13, nine pieces of altitude information need to be stored, in portion (b) of FIG. 13, interpolation point h8 is excluded from the interpolation points whose altitudes are to be stored, so that, by only storing altitude information of eight interpolation points, reduction in stored data is realized.

Furthermore, an example of realizing data reduction is described with reference to portion (c) of FIG. 13. In the example shown in portion (c) of FIG. 13, two sequential interpolation points that satisfy the condition $|Altitude(n+1)-Altitude(n)| \leq a$ are extracted. In addition, altitude information of an interpolation point numbered n or n+1 is excluded from interpolation points to be stored. The value of a is a predetermined threshold difference value, and is set to zero or greater. An example of reduction in altitude in the case of setting, for example, one meter is shown in portion (c) of FIG. 13. Portion (c) of FIG. 13 shows only interpolation points obtained after processing shown in portion (b) of FIG. 13. Accordingly, no interpolation point is set at the position of the interpolation point (h8) deleted in processing shown in portion (b) of FIG. 13.

Exclusion of one of two sequential interpolation points that satisfy the condition $|Altitude(n+1)-Altitude(n)| \leq 1$ corresponds to processing that excludes one of two sequential interpolation points having altitude information of a difference of one meter of less.

In the example in portion (c) of FIG. 13, interpolation points h3 and h4 satisfy the above condition since there is a difference of one meter between interpolation point h3, which has an altitude of 48 meters (indicated by H:48 m), and interpolation point h4, which has an altitude of 49 meters (indicated by H:49 m). In addition, interpolation points h7 and h8 satisfy the above condition since there is a difference of one meter between interpolation point h7, which has an altitude of 43 meters (indicated by H:43 m), and interpolation point h8, which has an altitude of 42 meters (indicated by H:42 m). Therefore, the altitude information of either interpolation point h3 or h4, and the altitude information of either interpolation point h7 or h8 can be excluded from interpolation points whose altitudes are to be stored.

Consequently, the number of interpolation points whose altitude information to be stored is reduced to six. When this data reduction is performed, the display positions of the route information and the vehicle symbol are calculated based on altitude information of the remaining interpolation points. However, as can be understood from the description with reference to FIG. 13, since interpolation points to be deleted from interpolation points to be stored have small differences in altitude compared with adjacent interpolation points, large error does not occur in altitude calculation for generating display data, thus preventing such unnatural drawing that the route information and vehicle symbol, displayed on the three-dimensional graphic data reflecting the actual altitude information, greatly shift to sink into the ground or float in the air.

The consecutive processing described in this specification can be executed by one of hardware and software, or a combination of both. In order to execute processing by software, the processing by software can be executed by installing, into a memory in a computer built in dedicated hardware, a program having a recorded processing sequence, or by installing the program into a multipurpose computer capable of executing various types of processing.

For example, the program can be recorded on a hard disk or a read-only memory (ROM) used as a recording medium. Alternatively, the program can be temporarily or eternally stored (recorded) on removable recording media such as a flexible disk, a compact-disk read-only memory (CD-ROM), a magneto-optical disk (MO), a digital versatile disk (DVD), a magnetic disk, and a semiconductor memory. The removable recording media can be provided as so-called "package software".

The program can be installed from the above recording media to a computer. In addition, by wirelessly transferring the program from a download site to the computer, or transferring the program to the computer by wire through a network such as the Internet, in the computer, the program transferred as described above can be received and installed into a built-in recording medium such as a hard disk.

Various types of processing described in this specification are executed in a time-series manner in accordance with the description. In addition, the various types of processing may be executed in parallel or separately depending on the processing capability of an apparatus executing the processing, or on demand. Furthermore, in this specification, the system is a logical set of a plurality of apparatuses and is not limited to a form having the apparatuses in a single housing.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus for displaying navigation information generated based on map information, the navigation apparatus comprising:
   positional information acquiring means for acquiring positional information;
   storage means for storing two-dimensional map data, three-dimensional graphic data, and node-based altitude data of recorded altitude data of nodes which are set on a link used as a route;
   a data processor for:
     calculating altitudes of points on the route based on the node-based altitude data;
     calculating an altitude of the navigation apparatus based on the positional information and based on the node-based altitude data;
     calculating an altitude of a vehicle having the navigation apparatus based on the positional information and the node-based altitude data;
     generating three-dimensional route information for a guidance region based on the positional information; and
     generating three-dimensional data obtained in observation from a camera viewpoint set within an allowable range for setting the camera viewpoint, the allowable range having altitudes not less than the altitude of the vehicle or the altitude of the navigation apparatus; and
   display means for displaying the three dimensional route information and the three-dimensional data, wherein
   the storage means:
     stores, as interpolation-point-based altitude data, altitude information of interpolation points set between two adjacent nodes, and
     excludes one of a first sequential interpolation point and a second sequential interpolation point when a difference between altitude information of the first sequential interpolation point and altitude information of the second sequential interpolation point is less than or equal to a predetermined threshold difference.

2. The navigation apparatus according to claim 1, wherein the data processor:
   positions a symbol on the display based on the altitude of the vehicle.

3. The navigation apparatus according to claim 1, wherein:
the node-based altitude data comprises recorded altitude data for each node included in each of the links, and
sequence information of a link identifier of a particular link to a destination is input to the data processor, and, based on altitude data of nodes in the particular link, three-dimensional route information reflecting altitude information for the route is generated and output to the display means by the data processor.

4. The navigation apparatus according to claim 1, wherein:
when three-dimensional data of a guidance point existing in a traveling direction is stored in the storage means, three-dimensional data of the guidance point is generated and output to the display means, and
when the three-dimensional data of the guidance point is not stored in the storage means, the two-dimensional map is acquired from the storage means and is output to the display means.

5. The navigation apparatus according to claim 1, wherein:
the data processor calculates the altitudes of points on the route based on the interpolation-point-based altitude data.

6. A data processing method for displaying navigation information generated based on map information, the data processing method comprising:
acquiring positional information;
calculating altitudes of points on a route based on node-based altitude data;
calculating an altitude of a navigation apparatus based on the positional information and based on the node-based altitude data;
calculating an altitude of a vehicle having the navigation apparatus based on the positional information and the node-based altitude data;
calculating altitudes of interpolation points on the route based on interpolation-point-based altitude data comprising interpolation points set between two adjacent nodes;
excluding from the interpolation points one of a first sequential interpolation point and a second sequential interpolation point when a difference between altitude information of the first sequential interpolation point and altitude information of the second sequential interpolation point is less than or equal to a predetermined threshold difference;
generating three-dimensional display information for a guidance region based on the positional information, the three-dimensional display information being obtained in observation from a camera viewpoint set within an allowable range for setting the camera viewpoint, the allowable range having altitudes not less than the altitude of the vehicle or the altitude of the navigation apparatus; and
displaying the three-dimensional display information.

7. The data processing method according to claim 6, wherein a symbol represents the vehicle, the symbol being positioned on the display based on the altitude of the vehicle.

8. The data processing method according to claim 6, wherein the node-based altitude data comprises recorded altitude data for each node included in each of the links, and the method further comprises:
receiving sequence information of a link identifier of a particular link to a destination; and
displaying the three-dimensional route information based on altitude data of nodes included in the particular link, the three-dimensional route information reflecting altitude information for the route.

9. The data processing method according to claim 6, wherein:
when three-dimensional data of a guidance point existing in a traveling direction is stored in the storage means, three-dimensional data of the guidance point is generated and output to the display means, and
when the three-dimensional data of the guidance point is not stored in the storage means, two-dimensional map data is acquired from the storage means and is output to the display means.

10. A computer-readable medium comprising instructions which, when executed by a processor, perform a method for displaying navigation information generated based on map information, the method comprising:
acquiring positional information;
calculating altitudes of points on a route based on node-based altitude data;
calculating an altitude of a navigation apparatus based on the positional information and based on the node-based altitude data;
calculating an altitude of a vehicle having the navigation apparatus based on the positional information and the node-based altitude data;
calculating altitudes of interpolation points on the route based on interpolation-point-based altitude data comprising interpolation points set between two adjacent nodes;
excluding from the interpolation points one of a first sequential interpolation point and a second sequential interpolation point when a difference between altitude information of the first sequential interpolation point and altitude information of the second sequential interpolation point is less than or equal to a predetermined threshold difference;
generating three-dimensional display information for a guidance region based on the positional information, the three-dimensional display information being obtained in observation from a camera viewpoint set within an allowable range for setting the camera viewpoint, the allowable range having altitudes not less than the altitude of the vehicle or the altitude of the navigation apparatus; and
displaying the three-dimensional display information.

11. The computer-readable medium according to claim 10, wherein the method further comprises:
acquiring interpolation-point-based altitude data used as altitude information of the interpolation points which are each set between nodes.

12. A navigation apparatus for displaying navigation information generated based on map information, the navigation apparatus comprising:
an input for acquiring positional information;
a memory that stores two-dimensional map data, three-dimensional graphic data, and node-based altitude data of recorded altitude data of nodes which are set on a link used as a route;
a data processor for:
calculating altitudes of points on the route based on the node-based altitude data;
calculating an altitude of the navigation apparatus based on the positional information and based on the node-based altitude data;
calculating an altitude of a vehicle having the navigation apparatus based on the positional information and the node-based altitude data;

generating three-dimensional route information for a guidance region based on the positional information; and generating three-dimensional data obtained in observation from a camera viewpoint set within an allowable range for setting the camera viewpoint, the allowable range having altitudes not less than the altitude of the vehicle or the altitude of the navigation apparatus; and a display device for displaying the three dimensional route information and the three-dimensional data, wherein the memory:

stores, as interpolation-point-based altitude data, altitude information of interpolation points set between two adjacent nodes, and excludes one of a first sequential interpolation point and a second sequential interpolation point when a difference between altitude information of the first sequential interpolation point and altitude information of the second sequential interpolation point is less than or equal to a predetermined threshold difference.

* * * * *